(12) United States Patent
Campos et al.

(10) Patent No.: US 10,532,291 B2
(45) Date of Patent: Jan. 14, 2020

(54) MANAGING GAME SESSIONS IN A SOCIAL NETWORK SYSTEM

(71) Applicant: Facebook, Inc., Menlo Park, CA (US)

(72) Inventors: Guilherme Oliverira Campos, Duvall, WA (US); Heesang Ju, San Francisco, CA (US); James Caruso, Seattle, WA (US); Calvin Patrick Grunewald, Issaquah, WA (US); Kevin Miller, Seattle, WA (US); Leif Erik Foged, Seattle, WA (US)

(73) Assignee: Facebook, Inc., Menlo Park, CA (US)

( * ) Notice: Subject to any disclaimer, the term of this patent is extended or adjusted under 35 U.S.C. 154(b) by 282 days.

(21) Appl. No.: 15/491,847

(22) Filed: Apr. 19, 2017

(65) Prior Publication Data

US 2018/0304159 A1 Oct. 25, 2018

(51) Int. Cl.

| A63F 13/31 | (2014.01) |
| A63F 13/87 | (2014.01) |
| H04L 29/08 | (2006.01) |
| H04L 12/58 | (2006.01) |
| A63F 13/493 | (2014.01) |
| A63F 13/5375 | (2014.01) |
| A63F 13/46 | (2014.01) |
| A63F 13/35 | (2014.01) |
| A63F 13/798 | (2014.01) |

(52) U.S. Cl.
CPC .............. *A63F 13/87* (2014.09); *A63F 13/46* (2014.09); *A63F 13/493* (2014.09); *A63F 13/5375* (2014.09); *H04L 51/32* (2013.01); *H04L 67/02* (2013.01); *H04L 67/146* (2013.01); *H04L 67/20* (2013.01); *A63F 13/35* (2014.09); *A63F 13/798* (2014.09)

(58) Field of Classification Search
CPC ........ A63F 13/30; A63F 13/33; A63F 13/335; A63F 2300/40; A63F 2300/401; A63F 2300/407; A63F 2300/57; A63F 2300/572; A63F 2300/5546
See application file for complete search history.

(56) References Cited

U.S. PATENT DOCUMENTS

| 7,549,924 B2 * | 6/2009 | Canessa .................. A63F 13/12 463/40 |
| 8,990,230 B1 | 3/2015 | Lunt et al. |
| 9,446,310 B2 | 9/2016 | Hoskins et al. |
| 2010/0029379 A1 * | 2/2010 | Lo ........................... A63F 13/12 463/29 |

(Continued)

OTHER PUBLICATIONS

U.S. Appl. No. 15/475,801 by Vaccari, A., et al., filed Mar. 31, 2017.

*Primary Examiner* — Steven J Hylinski
(74) *Attorney, Agent, or Firm* — FisherBroyles, LLP

(57) ABSTRACT

This disclosure is directed to enabling access to a game instance through a social network system. A client-side player component facilitates communication between a game instance on the client device and a backend server of a social networking system. The communication information can be stored in or retrieved from a social graph of the social networking system. The game instance can be initialized from a social platform of the social networking system, and the game can be played without leaving a social network application.

20 Claims, 21 Drawing Sheets

(56) References Cited

U.S. PATENT DOCUMENTS

| | | | |
|---|---|---|---|
| 2010/0106500 A1* | 4/2010 | McKee | G10L 13/00 |
| | | | 704/235 |
| 2010/0106612 A1* | 4/2010 | Gupta | A63F 13/12 |
| | | | 705/50 |
| 2011/0252238 A1* | 10/2011 | Abuan | H04L 61/2575 |
| | | | 713/168 |
| 2012/0143948 A1* | 6/2012 | Archambault | H04L 51/32 |
| | | | 709/204 |
| 2012/0214564 A1* | 8/2012 | Barclay | G07F 17/3227 |
| | | | 463/11 |
| 2012/0311686 A1* | 12/2012 | Medina | H04L 63/0807 |
| | | | 726/7 |
| 2014/0323226 A1* | 10/2014 | Agrawal | A63F 13/795 |
| | | | 463/42 |
| 2015/0050993 A1* | 2/2015 | Blayer | H04L 51/046 |
| | | | 463/31 |
| 2015/0135160 A1* | 5/2015 | Gauvin | H04W 4/21 |
| | | | 717/109 |
| 2016/0036734 A1* | 2/2016 | Ruth | A63F 13/35 |
| | | | 709/206 |
| 2018/0021678 A1* | 1/2018 | Speier | A63F 13/35 |
| | | | 463/42 |
| 2018/0280812 A1* | 10/2018 | Vaccari | A63F 13/87 |

* cited by examiner

MANAGING GAME SESSIONS IN A SOCIAL NETWORK SYSTEM

BACKGROUND

The first video games were played on massive computers connected to vector displays. Several generations of video game consoles connectable to a television were later developed having interchangeable discs or cartridges. Games on video game consoles could be played amongst users within an immediate vicinity. Online games are now played on various types of computing devices. An online game is a game that is either partially or primarily played by one or more users who communicate through the Internet or other data communications computer network. Conventional online game sessions are hosted or managed by a game server, which is typically a dedicated computer managed by the game publisher or other company. Users typically initiate online game sessions by directly accessing a web page of a third-part game server. Alternatively, applications ("apps") or console games may communicate with a server to exchange score information, game updates, etc.

Over the last several years, social networks have become a useful way to connect with acquaintances or businesses, e.g., to communicate. Social networks may have a social graph that identifies interrelationships between users. A subset of the users of a social network may be friends, in which case the social graph may have particular connections between nodes of the graph representing the users. Social network users, e.g., friends or other users, can be involved in various online conversations, e.g., by posting content on a friend's online "wall" or a company's online "page." Walls, pages, or other shareable areas of the social network (e.g., newsfeed, timeline, etc.) enable users to post and see various content, e.g., text, photographs, videos, etc. Some social networks also have a messaging app that enables two or more users to communicate with each other, e.g., by exchanging messages. Because social networks are now used by many millions (even billions) of users daily, they have the potential to offer game publishers tremendous opportunity to expand their online game presence in meaningful ways.

BRIEF DESCRIPTION OF THE DRAWINGS

These and other objects, features and characteristics of the present embodiments will become more apparent to those skilled in the art from a study of the following detailed description in conjunction with the appended claims and drawings, all of which form a part of this specification. While the accompanying drawings include illustrations of various embodiments, the drawings are not intended to limit the claimed subject matter.

DETAILED DESCRIPTION

Figure 1:
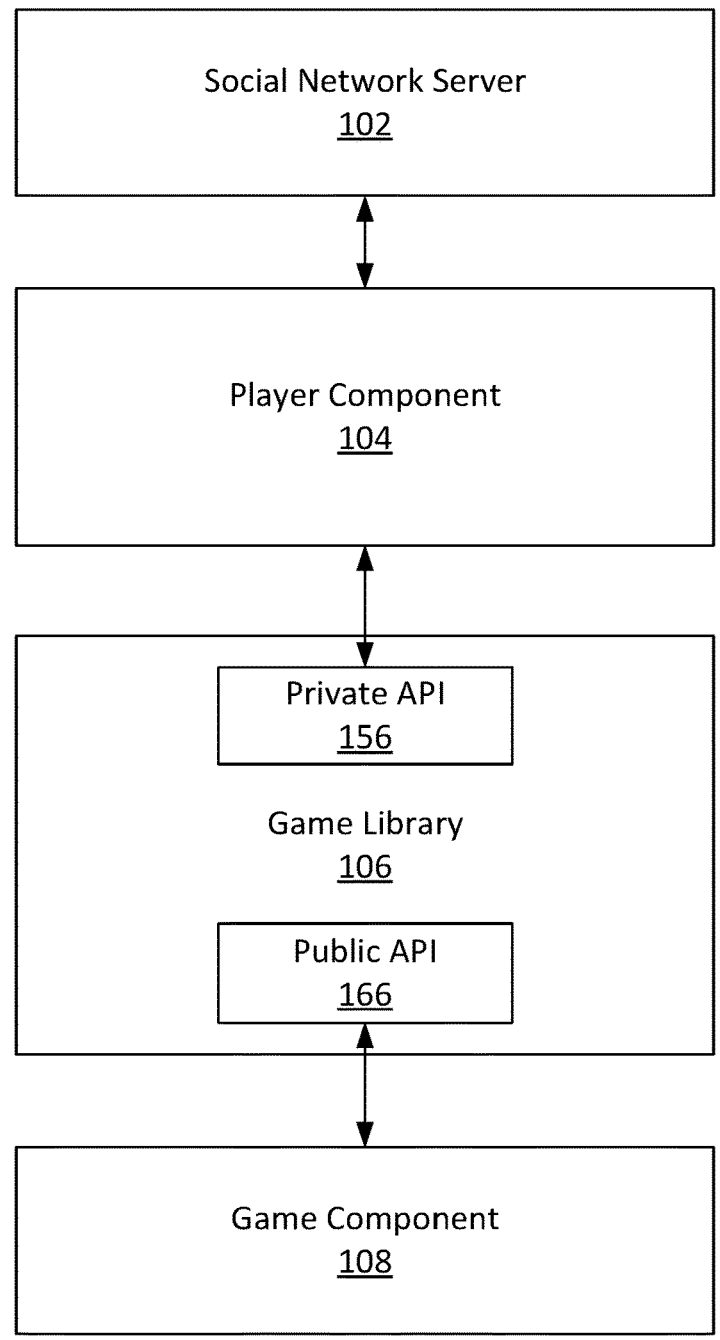
FIG. 1 is a block diagram illustrating components which, in some implementations, can be used in a system employing the disclosed technology.

This patent application is directed to enabling access to a game session within a social network system. The game session can be accessed within various areas of the social network, e.g., walls, newsfeeds, timelines, etc. The game session can also be accessed using related social network applications (e.g., a messenger application). The messenger application is an application that enables users to communicate online nearly instantaneously. A player component facilitates communication between a game instance on the client device and a backend server of a social networking system. The communication information can be stored in or retrieved from a social graph of the social networking system. The game instance can be initialized from a social network application (e.g., newsfeed, messenger, etc.) of the social networking system, and the game can be played without leaving the social network application.

In various embodiments, a user can identify a game to play using a discovery component. The discovery component may list multiple games and may list the games in a specified order. As an example, the discovery component may list games for a user based on that user's prior interactions with games, "friends" indicated in the social graph, contacts in a contact list, games played by the friends and/or contacts, etc.

In various embodiments, the user may receive a "challenge" in their social network newsfeed or messenger application app. As an example, the user may receive a notification that a friend or contact has achieved a high score in a particular game. The user can accept the challenge, e.g., by "clicking" or "pressing" on the notification, to start the game. A user may receive challenges from different users for a particular game. In various embodiments, the score the user achieves in the game may be posted to some or all the other users. As an example, the score may be shared with a different user who sent a particular challenge, all users who sent challenges, or publicly.

After the user plays a game, the user's score may be shared with other users, e.g., to challenge the other users. In various embodiments, the user can explicitly share the score, e.g., to challenge another user. In some embodiments, the score may be shared implicitly, e.g., to a "leaderboard" or as a challenge to friends or contacts. When the other user accepts the challenge, a thread of communication may be created between the user who sent the challenge and the user who accepted it.

Embodiments include integration of a gaming platform with a social networking system to enable substantially instant access to a game instance. The system architecture includes a client device that implements a client-side player component (e.g., a software component). The player component can facilitate communication between a game instance on the client device and a backend server of a social networking system. The communication can include high score, game participant identity, game participant connections, game session details, game achievements, etc. The communication information can be stored in or based on a social graph of the social networking system.

In various embodiments, each messenger app thread of communications between two or more users has a thread identifier ("thread ID"), each user of the social network has a user ID, businesses having social network pages have a page ID, and apps (e.g., game apps) have an app ID. Because a user may be simultaneously involved in playing a particular game with multiple other users, a combination of the various IDs may be used to identify a particular instance of the game, e.g., for score sharing purposes. As an example, the combination of thread ID and app ID identifies a particular game that is being played by users communicating in the thread. As another example, the combination of user ID, app ID, and page ID identifies a game hosted or sponsored by a business that the identified user is playing. Although this and the following discussion use a messaging app as a specific embodiment, one skilled in the art would recognize that the embodiments can be adapted for use with other social network conversation areas, e.g., walls, pages, newsfeeds, timelines, etc. In such cases, instead of a messaging thread ID, some other social network internal identifier can be employed (e.g., message identifier, conversation identifier, page identifier, etc.).

In various embodiments, some or all of these IDs may be anonymized. As an example, the user ID may be anonymized so that although the user's scores or score updates can be posted publicly or to other users of the social network or messenger app, the user may not be identifiable by others except perhaps the user's friends. Similarly, the thread ID may be anonymized so that the game developer cannot use the actual thread maliciously, e.g., to post advertisement messages that may be unrelated to the game. Just as thread IDs, app IDs, page IDs, and user IDs may be unique within the social network and/or messenger app, the respective anonymized IDs may also be unique.

In various embodiments, a game instance may employ the messenger app and its underlying communications protocols to exchange messages with other game instances. As examples, when a game is played by two different users in a thread, the game may exchange score information, cards of a card game, moves of a chess game, etc., between the game instances corresponding to each of the players. As a further example, when two players are in a messenger thread concurrently, one player may be able to remotely watch the other player's gameplay. An underlying "live stream" capability of the messenger platform may send a video stream of the game being played to the other user.

In various embodiments, various social signals may be sent relating to a user's game playing. As examples, a glyph or icon may be added to a user's profile photo when the user is a high scorer. As an example, a facial recognition system may identify the user's face in their profile photo and add a crown above the user's head in the photo. The modified profile photo may be limited to the messenger thread or may be available for all users of the social network or messenger app to view. Other social signals can include icons, animations, sounds, badges, etc. The social signals can correspond to scores, challenges, or other gaming concepts.

Third-party game servers typically utilize a vast assortment of inconsistent programming languages and protocols. Facilitating communication among these third-party servers using disparate programming languages is an unmanageable task on an individual basis. Embodiments include a game library having a private application program interface (API) to communicate with a client-side player component and a public API customizable to communicate with a game component hosted on the third-party server. Thus, the game library facilitates communication between the client-side player component and a third-party game component. Enabling communication between the game component and the player component via the game library unlocks a myriad of social network functions, including enabling users to initiate game sessions and freely share game-related data for games previously inaccessible through a social network system.

The game instance can be initialized from a social platform (e.g., newsfeed, messaging application, etc.) of the social networking system. The client-side player component can be implemented as part of a social networking website, which is accessible via a browser application running on the client device, or part of a social networking mobile application. The client-side player can access a plurality of web addresses representing third-party games (e.g., a game webpage that embeds a JavaScript library). A web server of a third-party game developer can host the game webpage. The JavaScript library can encode a public API to logic components within the game webpage and a private API to communicate with the client-side player component. That is, the JavaScript library can translate commands and messages between the client-side player component and the third-party game webpage. The client-side player component can load a splash screen from a game-related URL in parallel to a URL of the third-party game webpage, enabling players to experience substantially instant access to a game session. The client-side player component can further access social network information related to the game, prior to fully loading the game webpage onto the client device.

Turning now to the Figures, FIG. 1 is a block diagram illustrating components that, in some implementations, can be used in a system employing the disclosed technology. The illustrated components include a social network server 102, player component 104, game library 106, and game component 108.

The game library 106 facilitates communications between the player component 104 and the game component 108. The game library 106 can be imported by a third-party server and executed remotely by the third-party server. The game library 106 includes a private API 156 and a public API 166.

The game library 106 can use a private API 156 to communicate with the player component 104. The private API can be configured to communicate with a plurality of player components of various types. Types of player components include player components operable on a desktop/laptop computer (e.g., configured for Windows® or MacOS®) or a mobile device (e.g., configured for Android® or iOS). Types of player components also include a player component operable on the social network server 102 and provided to a user device via a web page accessible through a web browser. Each type of player component can include unique logic components. The private API is encoded with logic components of one or more types of player components.

The game library 106 can use the public API 166 to communicate with the game component 108. The public API 166 is encoded to logic components of the game component 108. The public API 166 can default to synchronous function calls for communications and include asynchronous function calls for limited communications to improve performance.

The game library 106 includes correlations mapping logic components of the player component 104 to logic components of the game component 108. The game library 106 translates communications received via the private API 156 from logic components consistent with the payer component 104 to logic components consistent with the game component 108 and transmits, via the public API 166, the translated communications to the game component 108. The game library 106 translates communications received via the public API 166 from logic components consistent with the game component 108 to logic components consistent with the player component 104 and transmits, via the private API 156, the translated communications to the player component 104.

The player component 104 communicates with the social network server 102. In some embodiments, game-related communication with the social network server 102 is performed exclusively by the player component 104. Game-related communication transmitted by the player component 104 to the social network server 102 can include, for example, game loading progress, game load completion, game screenshot, game completion, game score, fatal error notification, log messages, or any combination thereof. Game-related communication transmitted by the social network server 102 to the player component 104 can include, for example, a start instruction, restart instruction, pause instruction, save instruction, user device information, browser information, aspect ratio information, frame rate information, information related to social features (e.g., scores of friends in a social network), or any combination thereof.

The social network server 102 manages a game leaderboard comprising game scores associated with a plurality of users of the social network system. The social network server 102 updates a game leaderboard database in response to receiving data indicative of game scores for any user of a plurality of users corresponding to any game of a plurality of games.

Figure 2A:
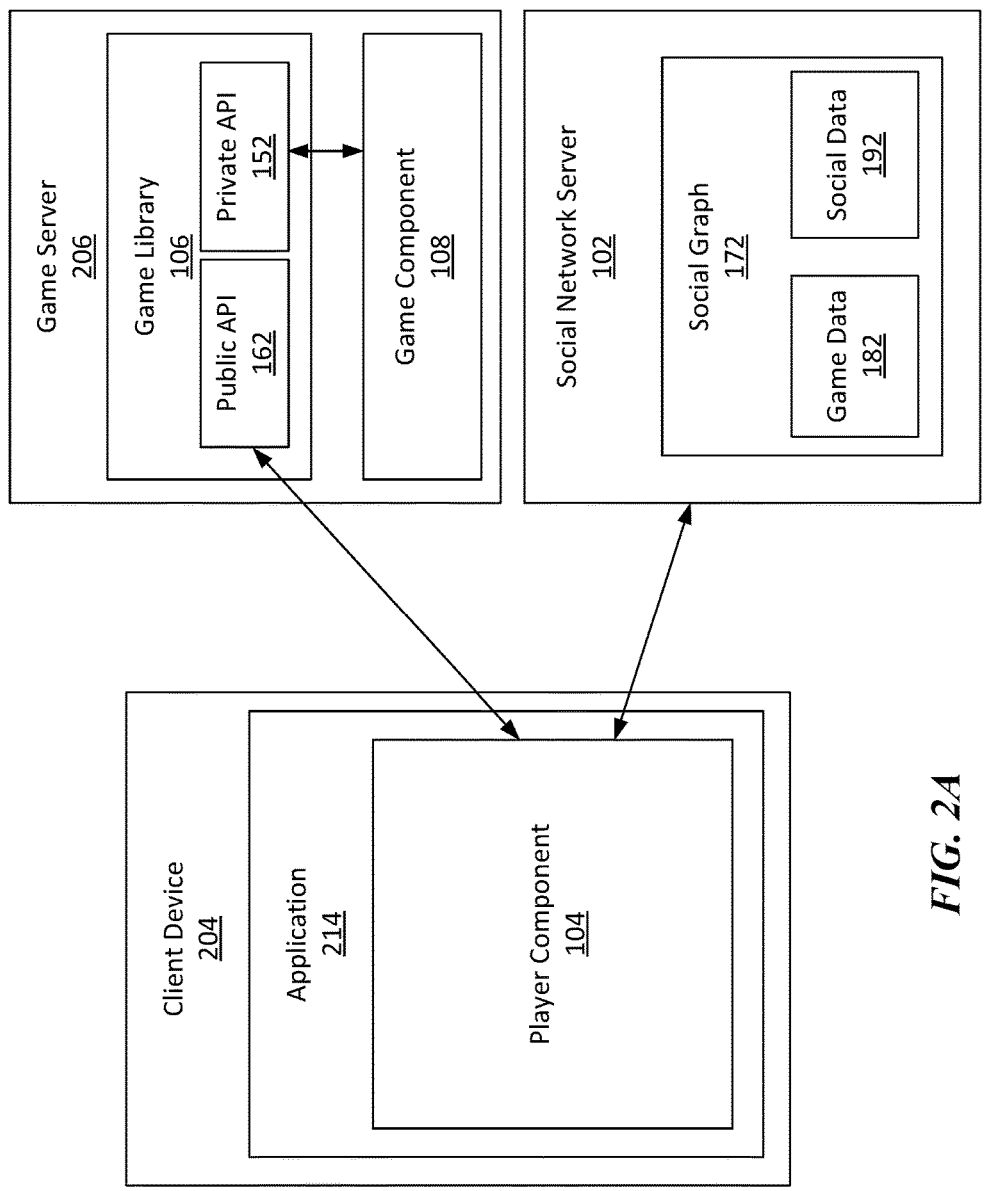
FIG. 2A is a block diagram illustrating an overview of an environment in which some implementations of the disclosed technology can operate.
Figure 2B:
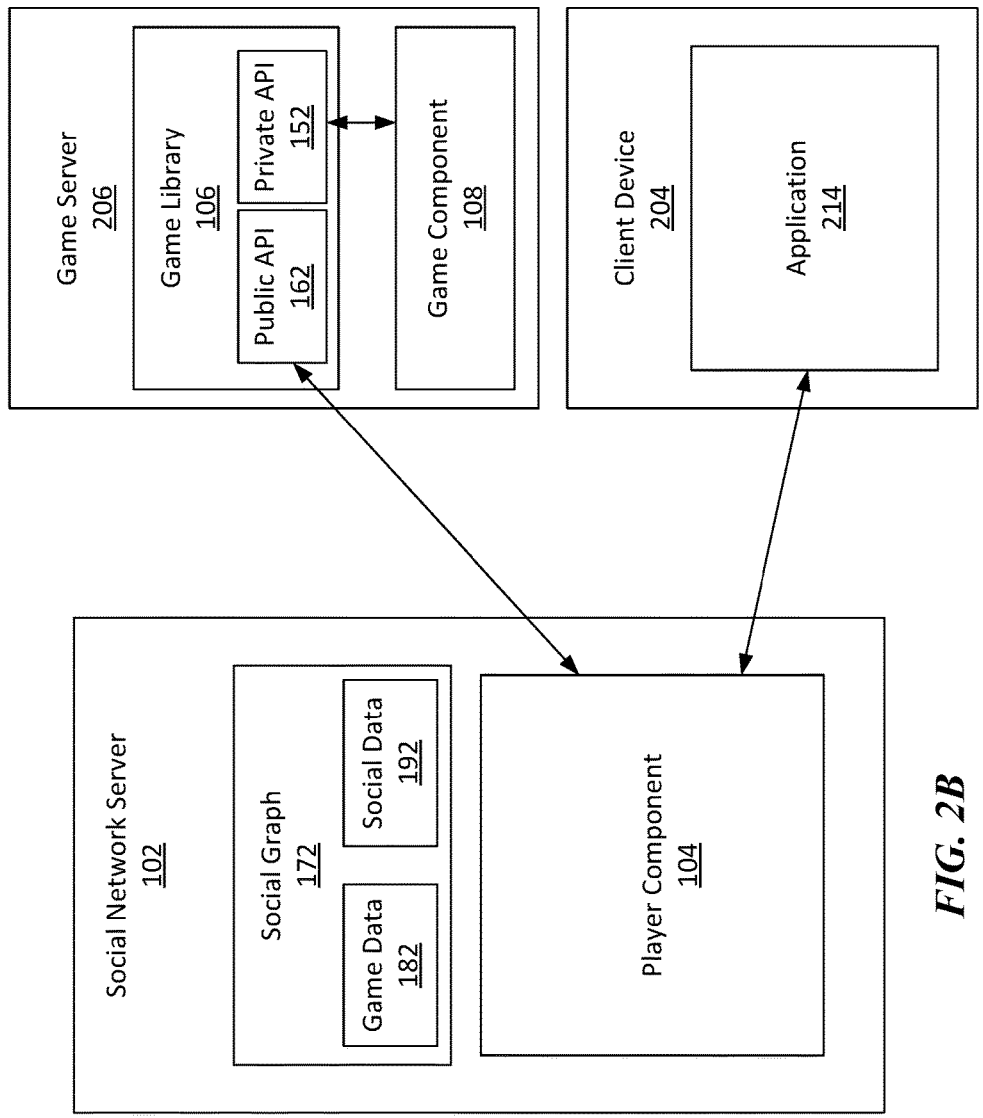
FIG. 2B is a block diagram illustrating an overview of another environment in which some implementations of the disclosed technology can operate.

FIGS. 2A-2B are block diagram illustrating an overview of an environment in which some implementations of the disclosed technology can operate. In an embodiment, the player component 104 is embedded in an application 214 (e.g., a messenger application) executed by a client device 204 (as shown in FIG. 2A). In another embodiment, the player component 204 can run on the social network server 202 and be accessible by the application 214 (as shown in FIG. 2B).

In an embodiment, the client device 204 can seamlessly switch from a game instance on a local player component (as shown in FIG. 2A) to a game instance on a remote player component (as shown in FIG. 2B) and vice versa. In response to a request to switch from a local to a remote player component, a state of a local game instance is stored. The state of the local game instance is provided to the social network server 202. The social network server 202 can execute a remote player component. The remote player component can use state information received from the local game instance to initiate another game instance having the same state as the local game instance. The application 214 (e.g., a messenger application having browser capabilities) running on the client device 204 accesses the remote player component to start a new game session having the same state as the local game session. A similar process can be performed in reverse to seamlessly switch from a remote player component to a local player component.

Referring now to FIG. 2A, the player component 104 can run on the client device 204. The player component can be embedded in the application 214. The application 214 can be, for example, a messenger application, social media application, browser, or any combination thereof. A combination messenger application and browser enables access to web pages without having to leave the messenger application. The player component 104 communicates with the game library 106 (e.g., via the public API 162) and with the social network server 102.

The game library 106 and the game component 108 can be hosted by a third-party game server 206. The game library 106 facilitates communication between the game component 108 and the player component 104. The private API 152 communicates with the game component 108, and the public API 162 communicates with the player component 104.

The player component 104 can be embedded in an application 214 running on the client device 204. The player component 104 receives translated game data from the game library 106. The player component 104 provides game-related information to the social network server 102 including, for example, game loading progress, game load completion, game screenshot, game completion, game score, fatal error notification, log messages, or any combination thereof.

The social network server 102 communicates with the player component 104 running on the client device 204. The social network server 102 stores game data 282 received from the player component 104 which can be used as part of a social graph 272. The social network server 102 transmits game-related information to the player component 104 including, for example, a start instruction, restart instruction, pause instruction, save instruction, user device information, browser information, aspect ratio information, frame rate information, information related to social features (e.g., scores of friends in a social network), or any combination thereof.

The social network server 102 includes the social graph 272. The social graph 272 includes information related to the social network system including, for example, game data 282 (e.g., information received from the player component 104) and social data 292 (e.g., associations between users). The social graph 272 includes a plurality of nodes that are interconnected by a plurality of edges. A social graph node may represent a social networking system object that can act on and/or be acted upon by another node. Each of these interactions can be stored as an edge of the social graph. In some embodiments, the edges can be represented as bi-directional. In other embodiments, the edges can be represented as directional. For example, a user node selecting a particular game to initiate a game instance, can be represented by either a bi-directional edge between the user node and the social network page or a directional edge from the user node to the social network page. The social graph can thus be stored as a database of edges between nodes. In some embodiments, the social graph can be stored separately for user interactions of a specific kind. In other embodiments, the social networking system stores the social graph without discriminating the type of user interactions.

An edge between nodes in a social graph represents a particular kind of connection between the nodes, which may result from an action that was performed by one of the nodes on the other node. Examples of such actions by a social networking system user include selecting a game to initiate a game session, challenging another user to play a selected game, sharing a game through a messenger application, and sharing a game in a news feed.

An implicit social graph connection can be determined based on the social graph of the social networking system. The implicit social graph connection can be leveraged from one or more recorded interactions. The user interactions can be received from a client device (e.g., client device 204) connected to the social networking system through a user account. An implicit social graph connection can be determined between any social graph object and any other social graph object. For example, from the user interaction, a connection generation module can identify a user account and a social network object (e.g., a game) related to that user interaction. An implicit social graph connection can be added to the social graph based on the user account and the social network object identified. The implicit social graph connection can be generated in response to determining the user interaction, or in a parallel batch process by surveying the social graph. The connection generation module can also calculate an edge weight for the implicit social graph connection, where the edge weight determines a quantitative likelihood that the user may later choose to make an explicit connection with the social network object. The social graph may improve accuracy of personalization of content over conventional methods.

One or more games can be associated with the user account by traversing a social graph of the social network system. A content entry associated with the identified game based on an implicit social graph connection can be generated. The content entry can be configured for display on the user device. The content entry can include images and/or text related to the identified game. For example, the content entry can include a name of a game, a logo associated with a game, user data related to a game, or any combination thereof. User data related to a game can include, for example, names of users who have played the game, scores of one or more users (e.g., on a leaderboard), a time a user played a game, a user who has challenged other users to a game, a user who has been challenged to a game, or any combination thereof.

Referring now to FIG. 2B, the player component 104 is executed by the social network server 202. The application 214 can access the player component 104, for example, by connecting to a web page hosted by the social network server 202. A game session is transferable from a local player component running on the client device 204 to a remove player component running on the social network server 202.

The player component 104 communicates with the game library 106 (e.g., via the public API 162) and the application 214. The player component 104 receives game information from the game library. The player component 104 provides game data to the social graph 172. As discussed above with respect to FIG. 2A, the social graph 172 is used to identify game suggestions associated with a user account.

Figure 3:
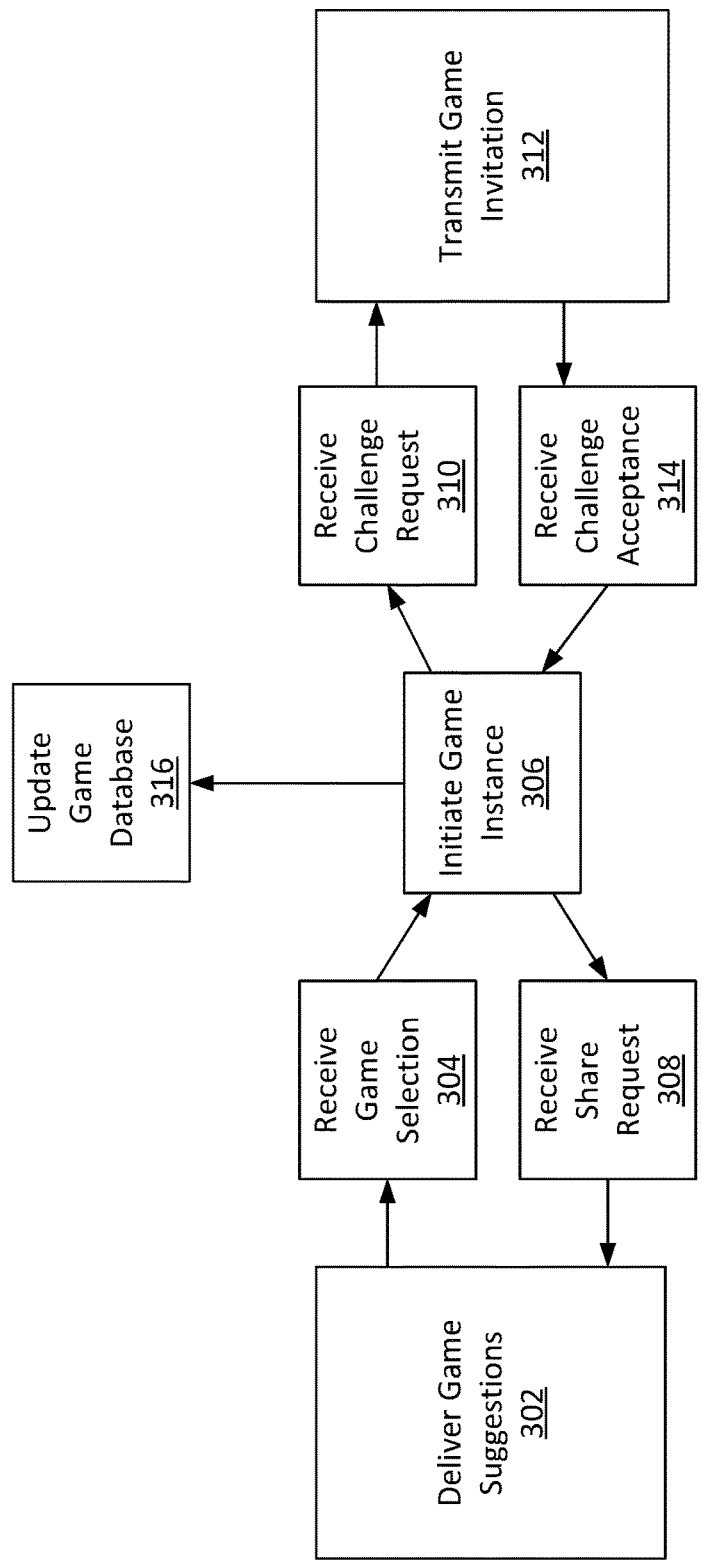
FIG. 3 is a flow diagram illustrating a process used in some implementations for managing game instances through a social platform.

FIG. 3 is a flow diagram illustrating a process used in some implementations for initiating game instances and sharing game-related information through a social network system. The social network system identifies game suggestions by, for example, traversing a social graph, as discussed above with respect to FIGS. 2A-2B and/or by receiving a share request from a user (block 308). The share request can be an invitation or challenge to start a game session of a particular game among a plurality of games. The social network system delivers game suggestions (block 302) to an application (e.g., messenger application) running on a user device. The suggested game may be identified by an app ID and posted within an existing messenger thread ID. The user device (e.g., client device 204) receives the game selection (block 304). The user device initiates the game instance (block 306) by utilizing a player component embedded in an application and configured to communicate with a game library. The player component can load a splash screen including game-related information such as, for example, loading progress, user score(s) (e.g., on a leaderboard), game play instructions, or any combination thereof.

The social network system receives game data during the game session and updates the game database (block 316). For example, the social network system can receive data related to a game loading progress, game load completion, game screenshot, game completion, game score, fatal error notification, log messages, or any combination thereof. The game data can be stored as part of a social graph used to identify game suggestions. The game data updates can include a user ID, app ID, and a thread ID so that a particular instance can be uniquely identified. The IDs may be anonymized, e.g., by using a consistent hashing function, encryption, etc.

The player component can prompt a user to share game information and/or challenge another user. In response to receiving a share request (block 308), the social network system delivers a game suggestion (block 302). In response to receiving a challenge request (block 310), the social network system transmits a game invitation (block 312). Another user device receives the game invitation and selects accept or decline. If the game invitation is declined, the game instance is not initiated. If the game invitation is accepted (block 314), the game instance is initiated (block 306) by another player component of the another user device.

In an embodiment, a messenger application having a player component embedded therein manages game sharing and challenges. Various embodiments for providing game suggestions to a user of the messenger application are contemplated. For example, a user can enter a game name in a text field of the messenger application. The message application identifies the game name and provides a content entry associated with the identified game name. The content entry can be sent to one or more users in a message field of the messenger application. The content entry can include the game name, image associated with the game, description of the game, and access information to enable a player component to access the game upon selection.

In another example, the social network system can traverse a social graph to identify games associated with a user. A content entry associated with identified game(s) can be transmitted to the messenger application. A user can share the content entry with other users in a message field of the messenger application.

In another example, the social network system can prompt a user before, during, or after a game session to select one or more users to challenge to the game. In response to receiving a challenge request for one or more users, the social network system transmits a game invitation to the one or more users. The game invitation can include a content entry indicating a user name of the challenger and including information related to the game (e.g., game name, image, description, and access information).

A content entry received in a message field of the messenger application is selectable to cause the player component to initiate a game instance. The player component can be embedded in the messenger application running on a user device or be running on the social network server. The messenger application can access the player component running on the social network server through a web page hosted on the social network server. The messenger application can transfer a game session from a first player component embedded in the messenger application to a second player component running on the social network server and vice versa. The messenger application stores a state of a game instance of the first game component and provides the state of the game instance to the second player component so the second player component can initiate a game instance with having the same state as the prior game instance.

Figure 4A:
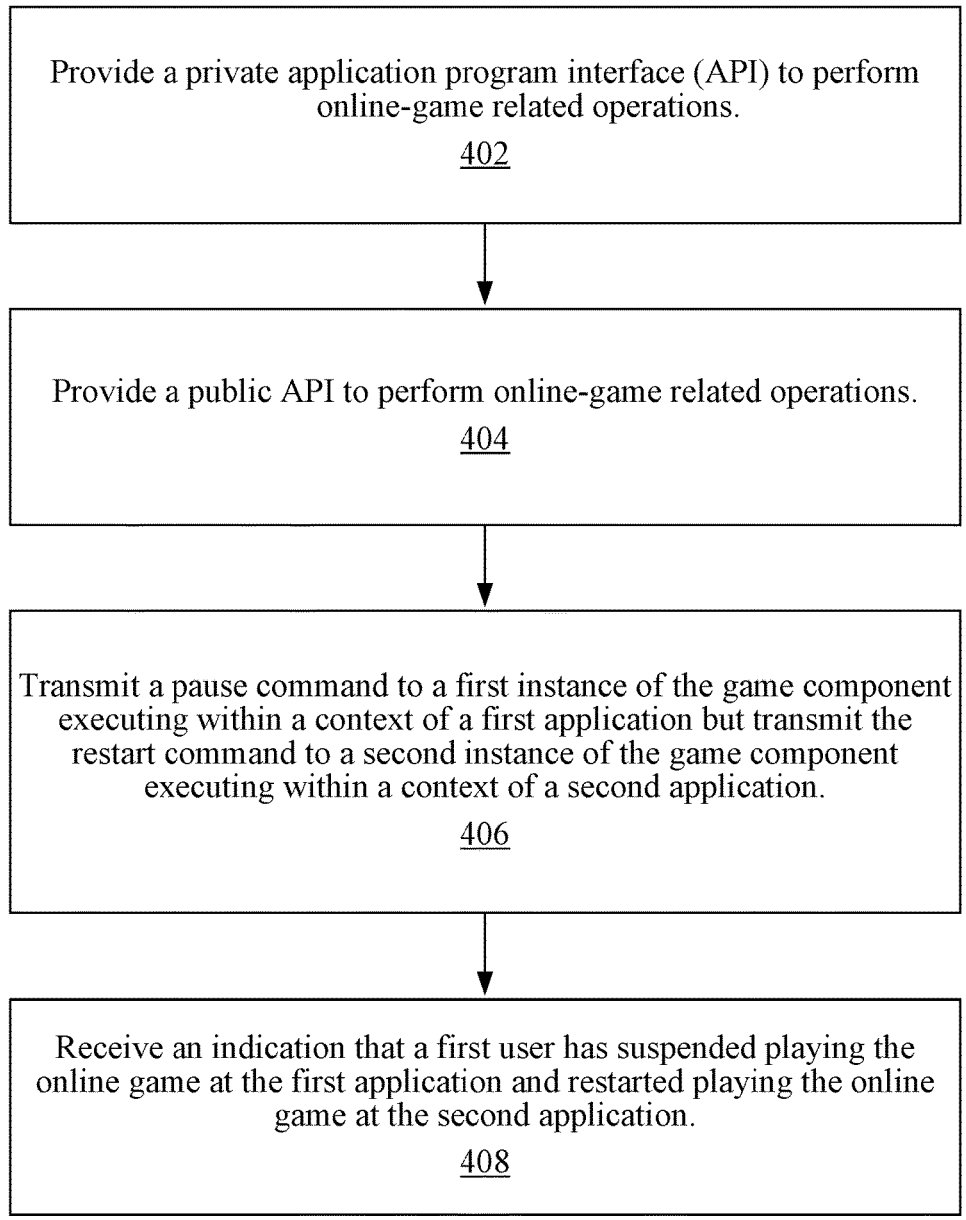
FIG. 4A is a flow diagram illustrating a process used in some implementations for managing game sessions in a social network system.

FIG. 4A is a flow diagram illustrating a process used in some implementations for facilitating communication between a player component and a game component. The method can include providing a private application program interface (API) (block 402), providing a public API, (block 404), transmitting a pause command to a first instance of the game component executing within a context of a first application but transmitting the restart command to a second instance of the game component executing within a context of a second application (block 406), and receiving an indication that a first user has suspended playing the online game at the first application and restarted playing the online game at the second application (block 408).

At block 402, the routine provides a private API. The private API is configured to communicate with a player component. The private API manages communication between the player component and the game library. The private API has one or more methods for performing a sequence of online-game related operations. The private API can receive, from the player component, a messaging service thread identifier. The messaging service thread identifier identifies an online conversation between at least two social network users. The private API can receive, from the player component, a gameplay command. The private API can receive status information (e.g., indicating gameplay complete, a game score, or a crash notification) from the player component.

The private API can be configured to communicate with a plurality of player components. The plurality of player components can include, for example, a first desktop player component compatible with a first operating system, a second desktop player component compatible with a second operating system, a first mobile player component compatible with a first mobile operating system, and a second mobile player component compatible with a second mobile operating system. The private API transmits a plurality of communications to the player component including, for example, screenshots, score, game over events, fatal errors, and log messages. The public API receives a plurality of communications from the player component including, for example, screenshot request, play event, pause event, and restart event.

At block 404, the routine provides a public API. The public API is configured to communicate with a game component. The public API manages communication between the game component and the game library. The public API has one or more methods for performing a sequence of online-game related operations. The public API can receive, from the game component, a game instance identifier. The game instance identifier identifies a particular instance of the online game. The online game is capable of being played on one or more computing devices. The public API associates the received messaging service thread identifier with the game instance identifier. The public API transmits, to the game component, the gameplay command to cause the game component to respond to the gameplay command. The gameplay command can include one of play, pause, or restart.

The public API uses synchronous function calls as a default and asynchronous function calls for a limited set of communications. Asynchronous function calls are used for the limited set of communications to increase performance. The limited set of communications can include, for example, promises.

At block 406, the routine causes the public API to transmit a pause command to a first instance of the game component executing within a context of a first application. The public API also transmits the restart command to a second instance of the game component executing within a context of a second application. The first instance and the second instance have a same game instance identifier. The first instance is paused and the second instance is started to transfer a game session.

At block 408, the routine causes the private API to receive an indication that a first user has suspended playing the online game at the first application and restarted playing the online game at the second application. The game library uses this information to determine where to transmit game-related information. Since the game session is active in the second application, the game library uses the public API to transmit game related information to a player component associated with the second application. The first user and a second user can continue to conduct an online conversation using the messaging service during a game session.

Figure 4B:
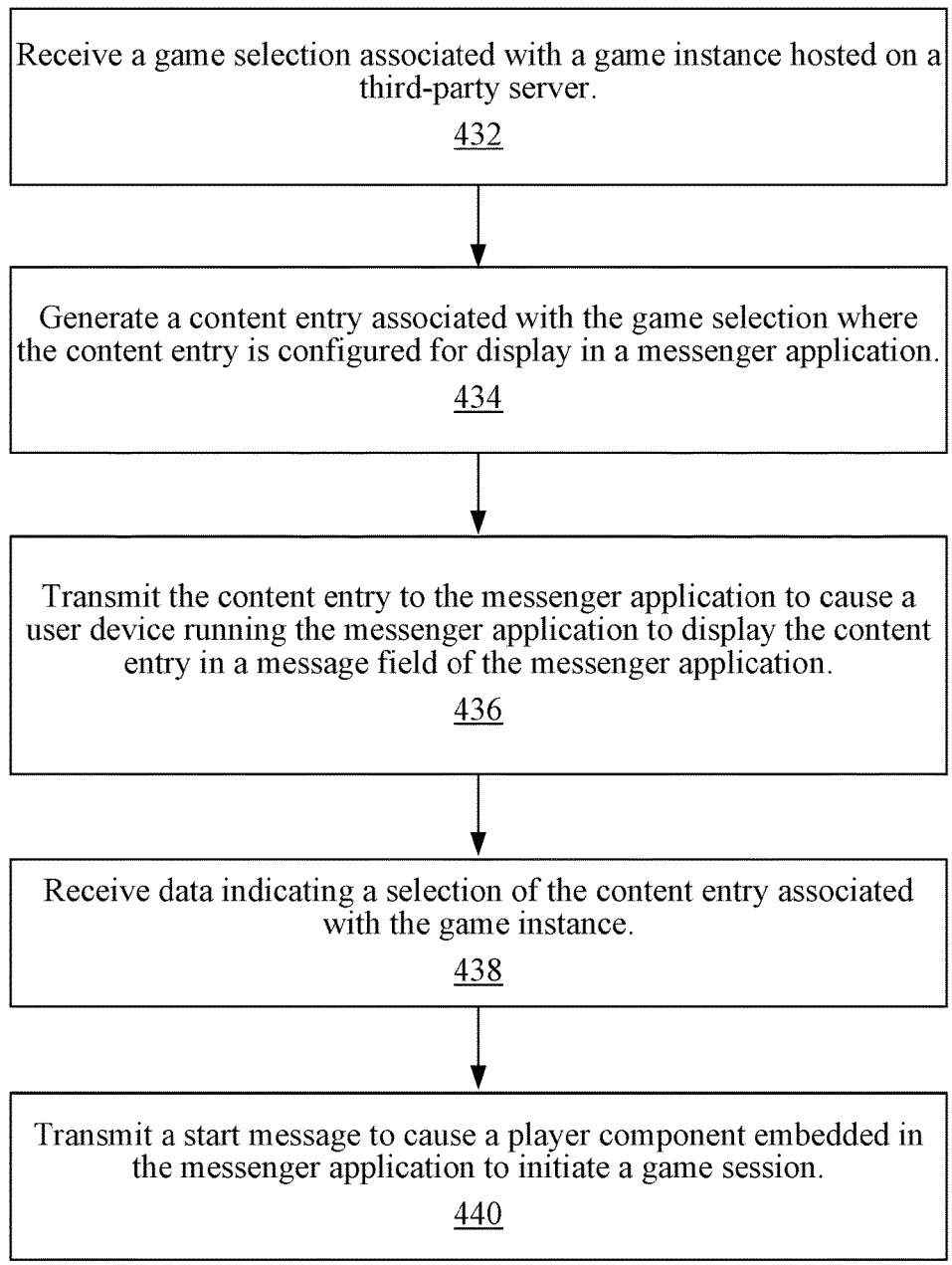
FIG. 4B is a flow diagram illustrating a process used in some implementations for managing game sessions in a social network system.

FIG. 4B is a flow diagram illustrating a process used in some implementations for enabling access to a game instance through a social platform. The method includes receiving a game selection (block 432), generating a content entry (block 434), transmitting the content entry to the messenger application (block 436), receiving data indicative of a selection of the content entry (block 438), and transmitting a start message (block 440). The description is provided as an example and not intended to be limiting. Although the social network server is described as performing various functions, other devices such as the client device are also contemplated for performing the various functions.

At block 432, the social network server receives, from a device associated with a user account, a game selection associated with a game component hosted on a third-party server. An application (e.g., a messenger application) receives a game selection from the user and transmits the game selection to the social network server. An application may be logged into a user account to receive a suggested game. The suggested game can be solicited by input from a user or be an unsolicited suggestion identified based on an association with the user account (e.g., by traversing a social graph). For example, a user of the messenger application can input a game name into a text bar, the messenger application can provide a drop down menu suggesting one or more games, and the user selects a game to transmit to another user of the messenger application. In another example, the messenger application displays a popup suggesting a game associated with a user account and another user account (e.g., according to an analysis of the social graph) where the popup indicates that the another user account may be interested in the game as well. A user logged into the user account selects the game in the popup message to be sent to the another user account.

At block 434, the social network server generates a content entry associated with the game selection, the content entry being configured for display in a messenger application. The content entry can include images and/or text related to the identified game as well as access information (e.g., an identification number associated with the identified game). For example, the content entry can include a name of a game, a logo associated with a game, user data related to a game, or any combination thereof. User data related to a game can include, for example, names of users who have played the game, scores of one or more users (e.g., on a leaderboard), a time a user played a game, a user who has challenged other users to a game, a user who has been challenged to a game, or any combination thereof. In an embodiment, one or more elements of the content entry are customizable by a user making the game selection. For example, a user making a game selection can be prompted to select an image or text. In another example, a user can select a setting in an application (e.g., the messenger application) to change a default content entry transmitted and/or received by the user. For example, a user can select a setting to omit images in a content entry. In another example, a user can select a setting to enlarge images and/or text in a content entry. In another example, a user can select a setting to include or omit animations in a content entry.

At block 436, the social network server transmits the content entry to the messenger application to cause a user device running the messenger application to display the content entry in a message field of the messenger application. The content entry is displayed in a message field of the messenger application logged into the user account and a message field of the messenger application logged into another user account included in the conversation. The content entry displayed for the user account and the another user account can vary based on a content entry setting selected in the messenger application.

At block 438, the social network server receives data indicative of a selection of the content entry associated with the game instance. The another user selects the content entry in the message field to initiate a game session. Upon selecting the content entry data indicative of the selection is transmitted to the social network system.

At block 440, the social network server transmits a start message to cause a player component embedded in the messenger application to initiate a game session in response to receiving the data indicative of the selection. Upon receiving the start message, the player component initiates a game instance to start a game session. The player component can be embedded in the messenger application or running on the social network server and accessible to the messenger application via a web page.

Figure 4C:
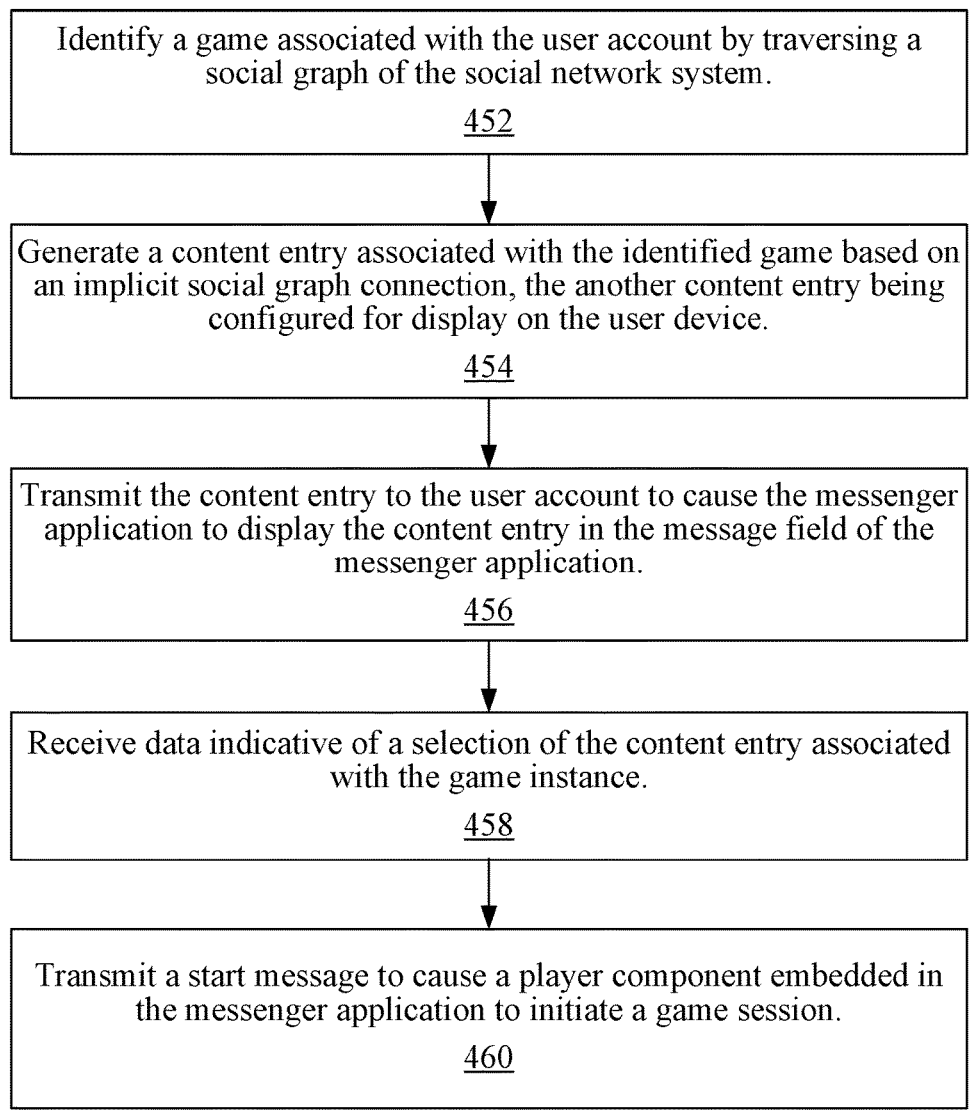
FIG. 4C is a flow diagram illustrating a process used in some implementations for managing game sessions in a social network system.

FIG. 4C is a flow diagram illustrating a process used in some implementations for enabling access to a game instance through a social platform. The method includes identifying a game associated with the user account by traversing a social graph of the social network system (block 452), generating a content entry (block 454), transmitting the content entry to the user account (block 456), receiving data indicative of a selection of the content entry (block 458), and transmitting a start message to cause a player component embedded in the messenger application to initiate a game session (block 460).

At block 452, the social network server identifies a game associated with the user account by traversing a social graph of the social network system. The implicit social graph connection can be leveraged from one or more recorded interactions of a social network user. Examples of recorded actions include selecting a game to initiate a game session, challenging another user to play a selected game, sharing a game through a messenger application, and sharing a game in a news feed. An edge weight for the implicit social graph connection can be calculated, where the edge weight determines a quantitative likelihood that the user may later choose to make an explicit connection with the social network object. An edge weight exceeding a threshold likelihood of an explicit connection results in identifying an association between a game object and a user account.

At block 454, the social network server generates a content entry associated with the identified game based on an implicit social graph connection, the another content entry being configured for display on the user device. The content entry can include images and/or text related to the identified game as well as access information.

At block 456, the social network server transmits the content entry to the user account to cause the messenger application to display the content entry in the message field of the messenger application. The content entry can be displayed as a selectable prompt that a user can accept or decline. The content entry can disappear if a user declines and remain if a user accepts. The content entry can be shared with other users. The content entry is selectable to initiate a game session.

At block 458, social network server receives data indicative of a selection of the content entry associated with the game instance. The user selects the content entry in the message field to initiate a game session. Upon selecting the content entry data indicative of the selection is transmitted to the social network system.

At block 460, the social network server transmits a start message to cause a player component embedded in the messenger application to initiate a game session in response to receiving the data indicative of the selection. Upon receiving the start message, the player component initiates a game instance to start a game session. The player component can be embedded in the messenger application or running on the social network server and accessible to the messenger application via a web page.

Figure 4D:
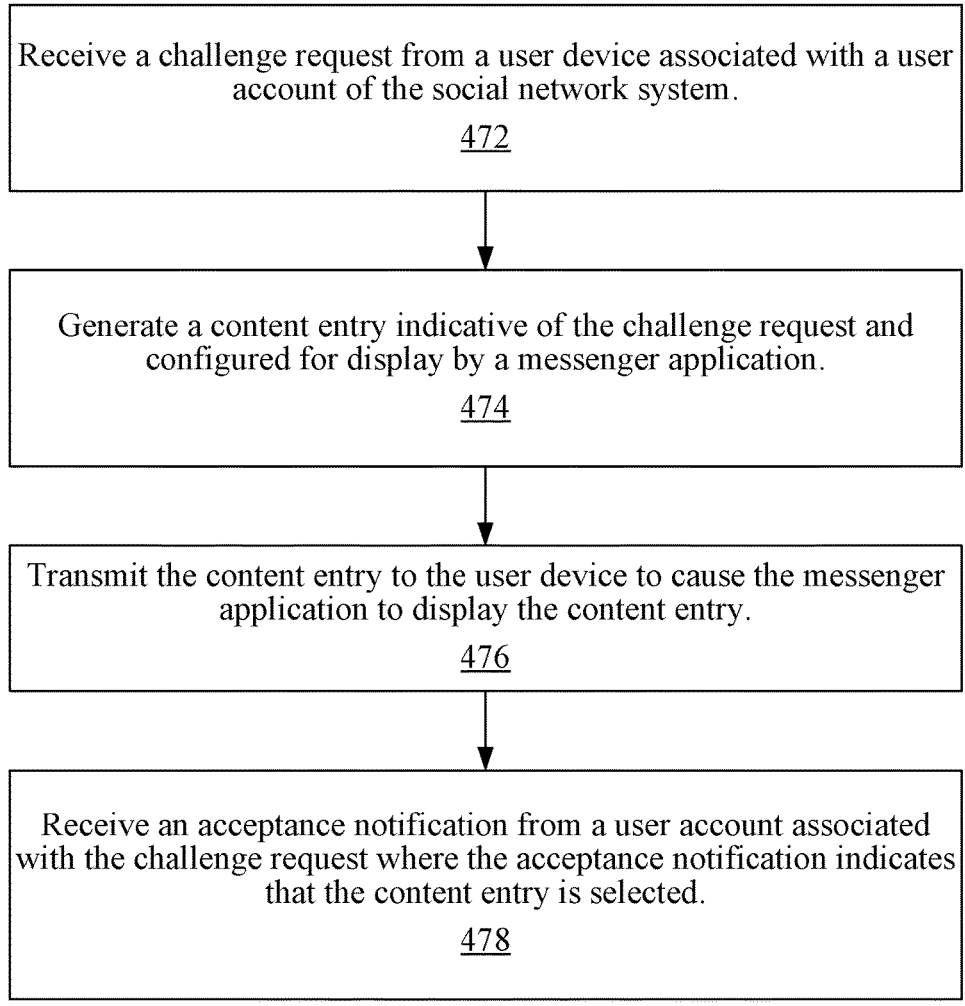
FIG. 4D is a flow diagram illustrating a process used in some implementations for managing game sessions in a social network system

FIG. 4D is a flow diagram illustrating a process used in some implementations for enabling access to a game instance through a social platform. The method includes receiving a challenge request (block 472), generating a content entry (block 474), transmitting the content entry to the user device to cause the messenger application to display the content entry (block 476), receiving an acceptance notification from a user account associated with the challenge request (block 478).

At block 472, the social network server receives a challenge request associated with the game selection from a user device associated with a user account of the social network system. The player component provides a selectable prompt for challenging one or more users to a game. Upon selection of a challenge for one or more players to a game, the player component transmits the challenge request to the social network server.

At block 474, the social network server generates a content entry indicative of the game selection and the challenge request configured for display by a messenger application. The social network server generates the content entry indicative of the challenge request. The content entry for the challenge request includes information indicative of the user submitting the challenge request as well as information about the game object.

At block 476, the social network server transmits the content entry to the user device to cause the messenger application to display the content entry. The content entry can be displayed in a message field of the messenger application.

At block 478, the social network server receives an acceptance notification from a user account associated with the challenge request. The acceptance notification indicates that the content entry is selected. The acceptance notification causes the messenger application to initiate a player component to communicate with a game webpage hosted on the third-party server. The player component initiates a game instance. The player component is embedded in the messenger application or accessible via a web page hosted on the social media server.

Figure 5A:
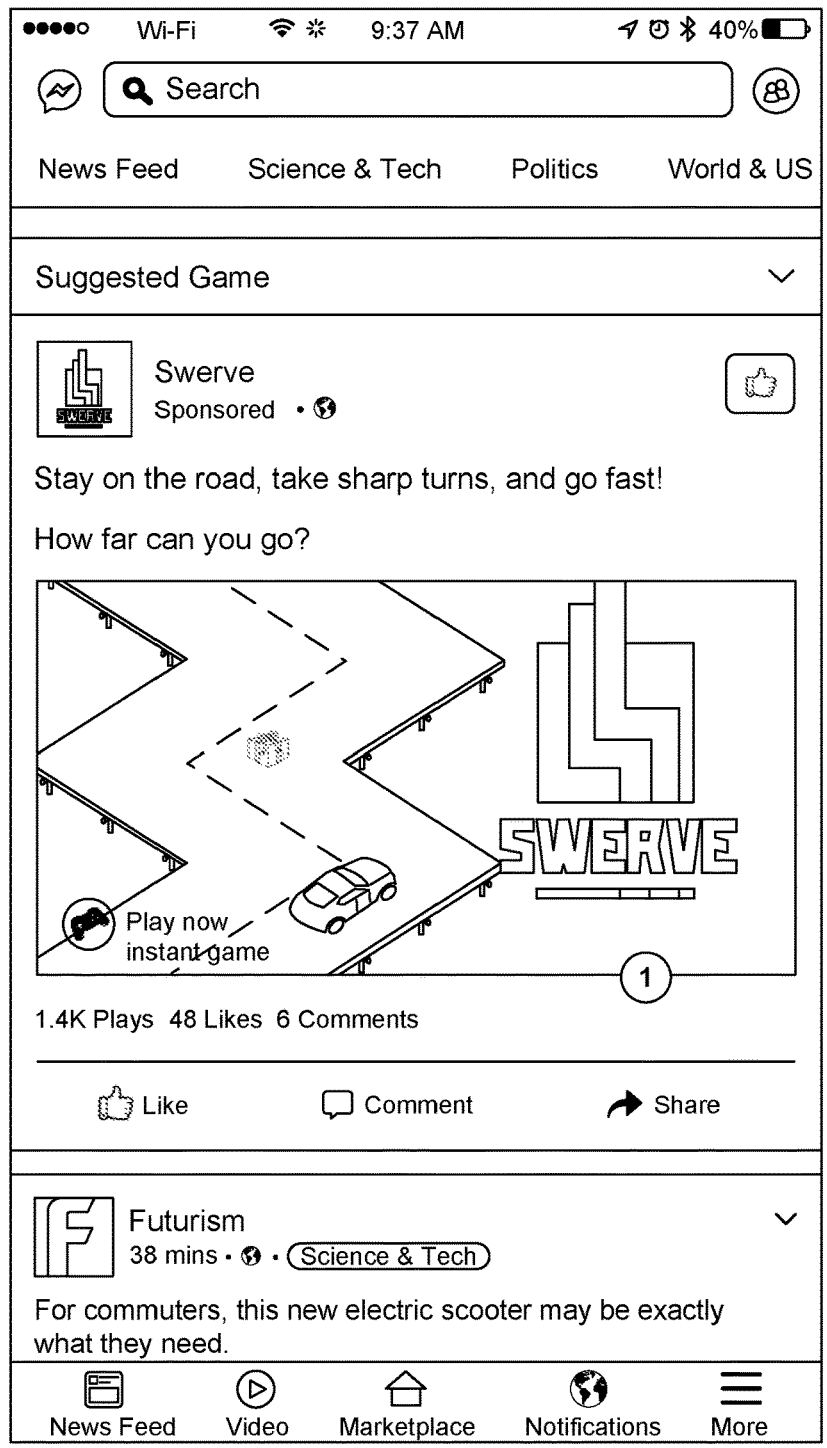
FIGS. 5A-5C are illustrations of an example graphical user interface on a client device.
Figure 5B:
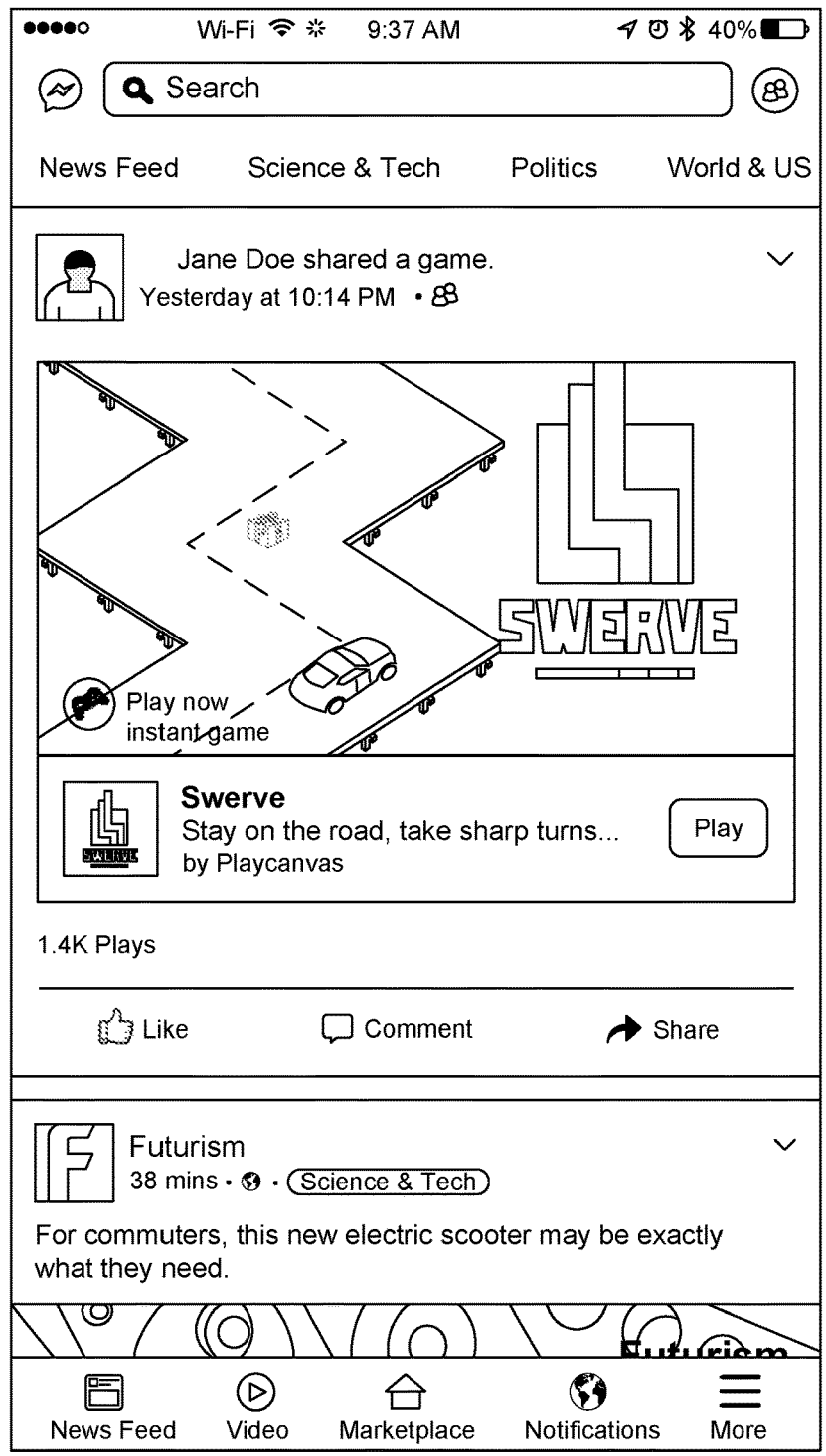
Figure 5C:
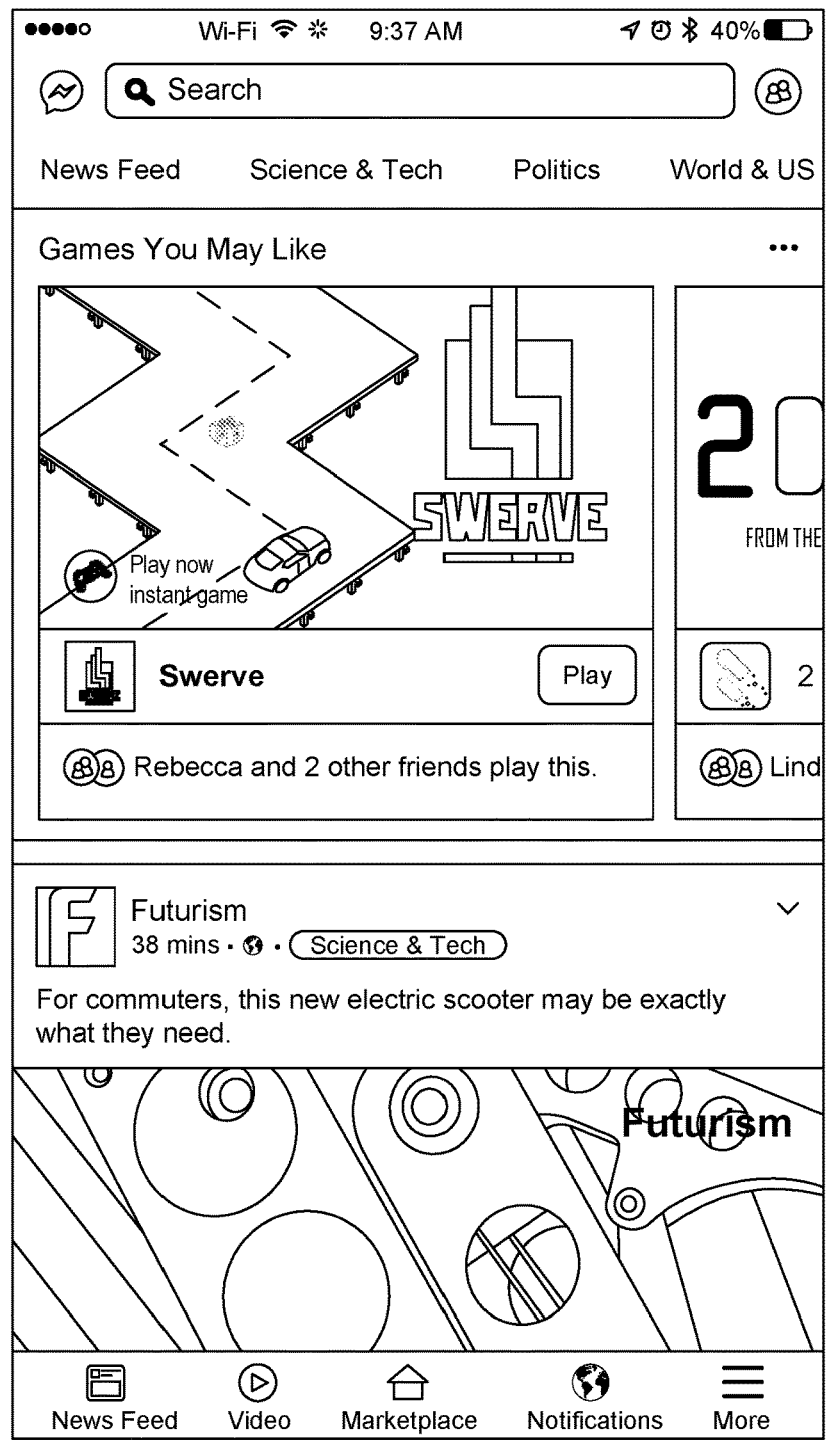

FIGS. 5A-5C are illustrations of an example graphical user interface on a client device. FIG. 5A illustrates a content entry displaying a game suggestion provided in a news feed of a social media application or thread of a messenger app. FIG. 5B illustrates a content entry shared by a user on the news feed of the social media application. FIG. 5C illustrates a content entry displaying a suggested game identified by traversing a social graph of the social network system. Additional content entries can be provided upon receiving an input gesture (e.g., detecting a swipe across a touchscreen). Although the illustrations are of a newsfeed, one skilled in the art will recognize that a similar interface can be provided within a messenger app thread.

The content entry includes the game name ("Swerve") a game description ("Stay on the road, take sharp turns, and go fast!"), an image of the game including a game logo, social feedback elements (e.g., "Like", "Comment", and "Share" as well as a number of plays, likes, comments, and shares), and access information to enable a user to select the game to initiate a game session through a player component.

Figure 6A:
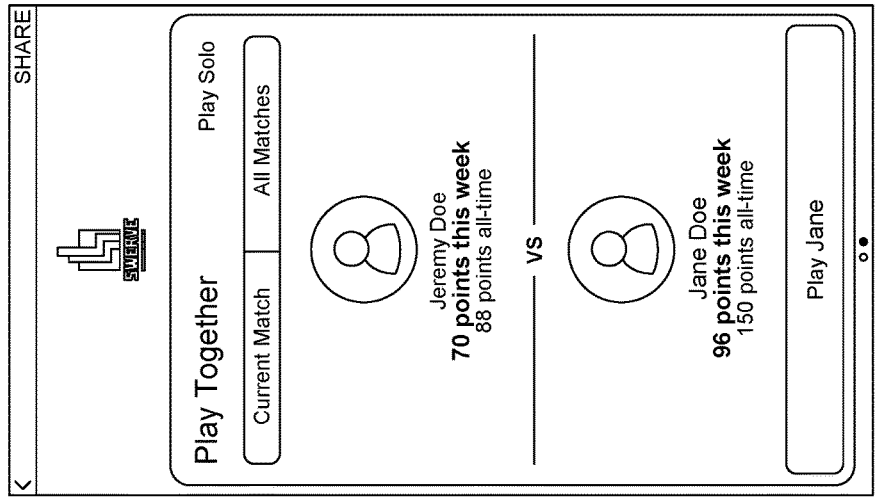
FIGS. 6A-6D are illustrations of an example graphical user interface on a client device.
Figure 6B:
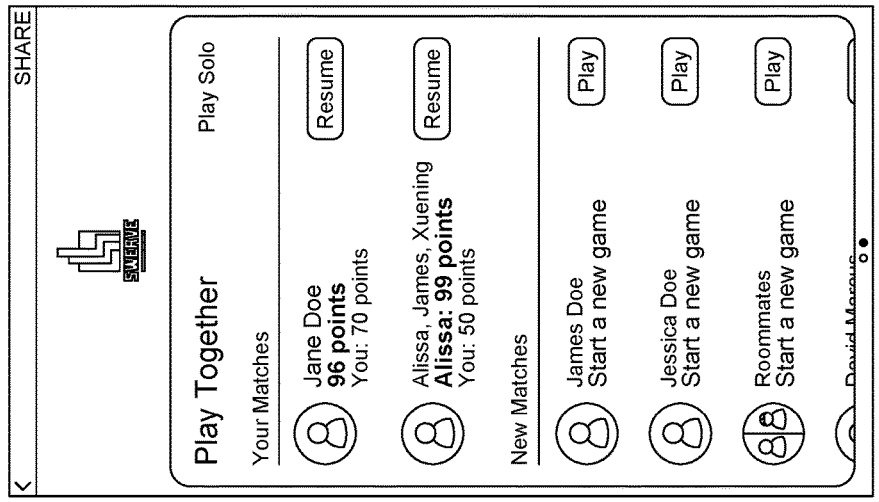

FIGS. 6A-6D are illustrations of an example graphical user interface on a client device. FIG. 6A shows a plurality of matches among a plurality of users of the social network system. Matches can be resumed to continue a game session where a last game session ended. Unplayed matches can be provided. Unplayed matches include suggested matches and challenged matches that have not been initiated. Matches as shown in FIG. 6A are selectable to display match details as shown in FIG. 6B. FIG. 6B shows a particular match between Jeff Doe and Jane Doe.

Figure 6C:
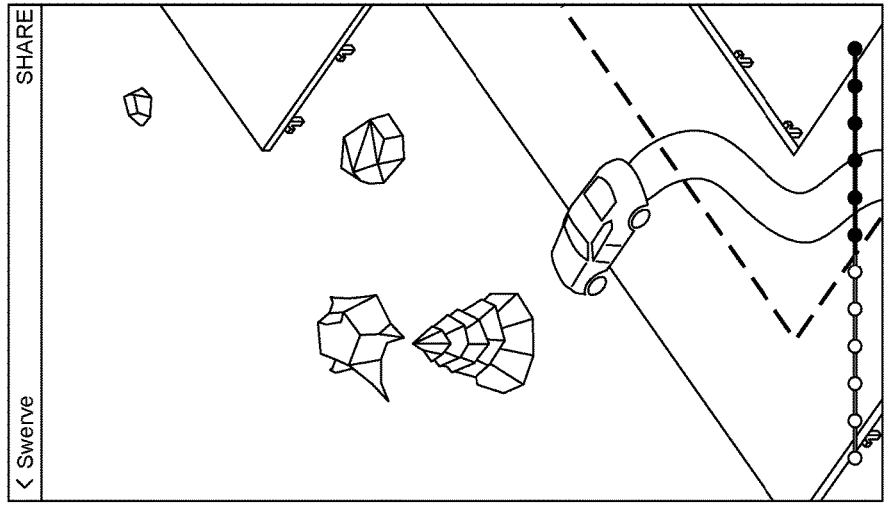
Figure 6D:
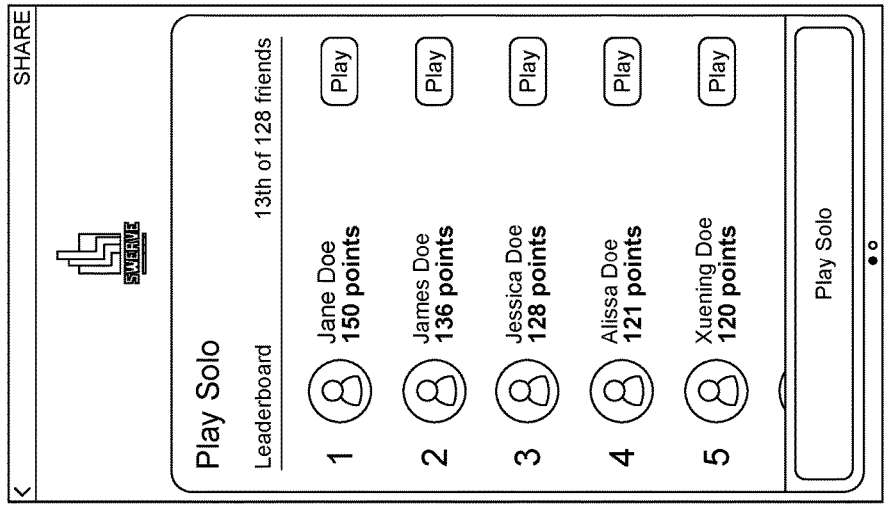

FIG. 6C shows a leaderboard for a game object. The social network server maintains a leaderboard for a plurality of game objects. Game scores received by the social network server are used to update the maintained leaderboard. Upon receiving a play selection, a game is initiated by the player component as shown in FIG. 6D.

Figure 7B:
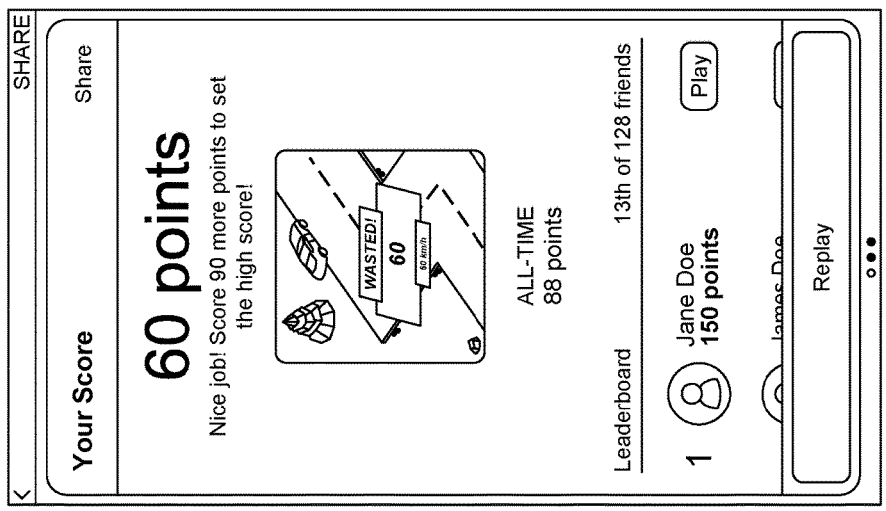
FIG. 7A-7D are illustrations of an example graphical user interface on a client device.
Figure 7A:
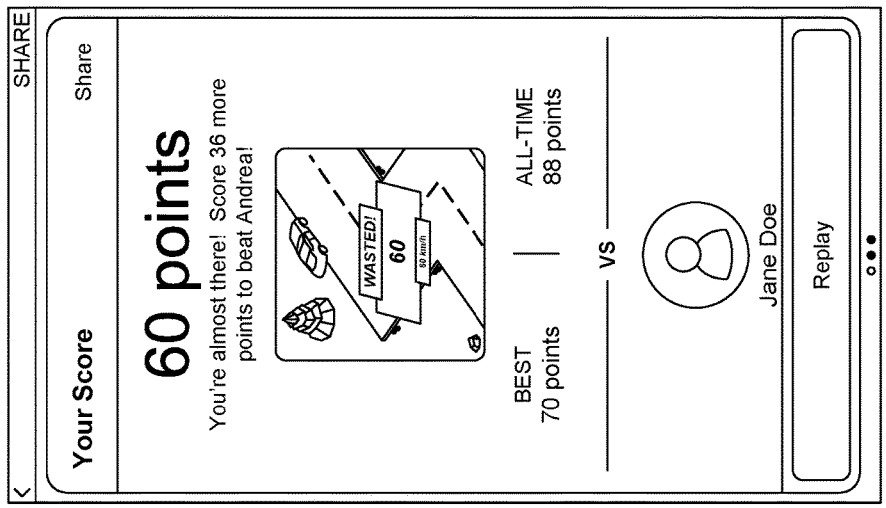
Figure 7D:
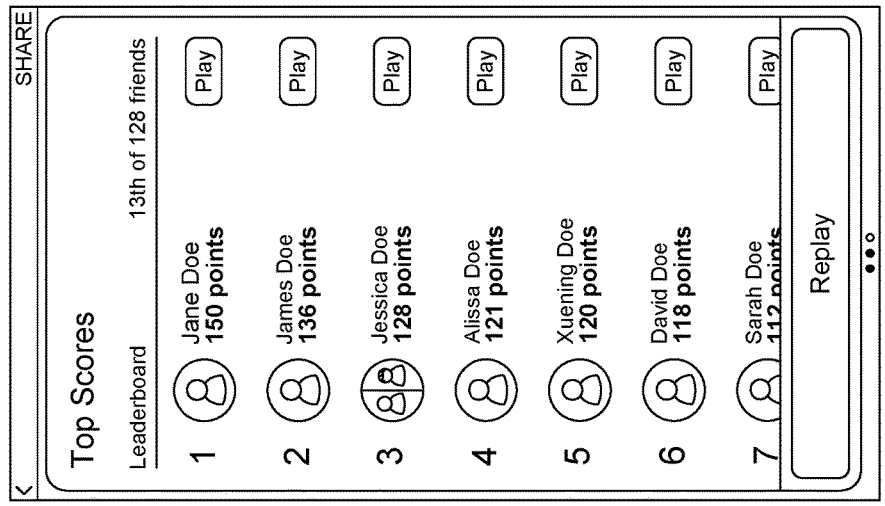
Figure 7C:
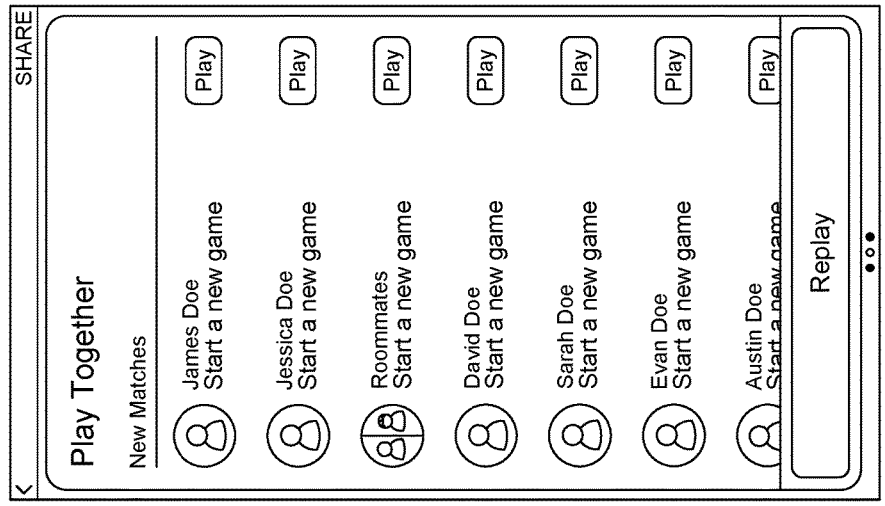

FIG. 7A-7D are illustrations of an example graphical user interface on a client device. Following a game session, game-related information can be provided. FIG. 7A shows a client device displaying statistics for a particular game and indicating a game score needed to beat another user. FIGS. 7B and 7D show a leaderboard that can be provided following a game session. The leaderboard can include a rank for a user among a plurality of other users (e.g., "13th of 128 friends"). Additional matches as shown in FIG. 7C can be provided following a game session.

Figure 8A:
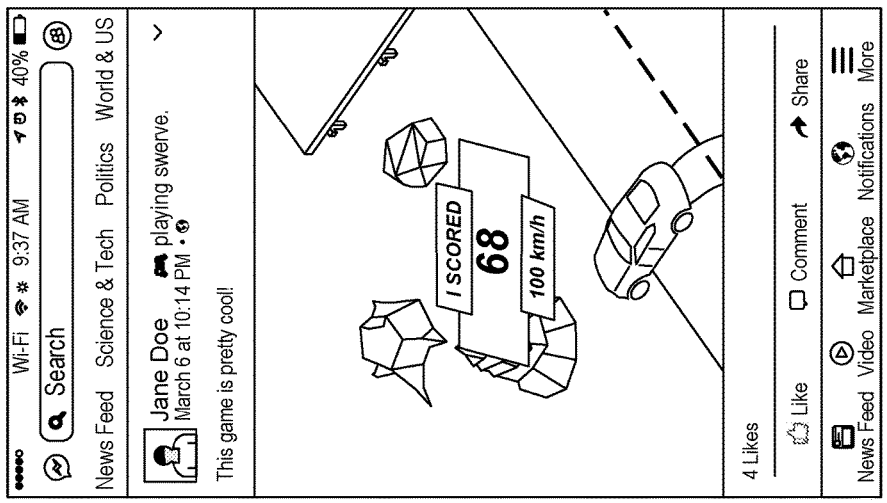
FIGS. 8A-8D are illustrations of an example graphical user interface on a client device.

FIGS. 8A-8D are illustrations of an example graphical user interface on a client device. The social network server can receive a share request following a game session. In response to receiving a share request, the social network server generates a content entry including game-related information. FIG. 8A shows an example of a content entry shared by Jane Doe. A content entry can be shared, for example, in a news feed and in a message field.

Figure 8B:
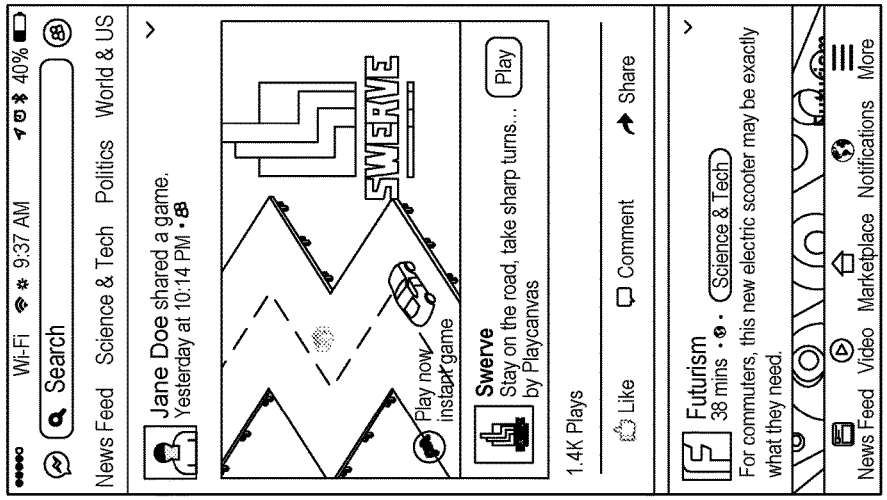

The social network server can generate a content entry for display in an application in response to a request or without being solicited by a user. For example, a content entry can be generated during a game session as shown in FIG. 8B. The content entry can include a real-time animation of the game session. The content entry can be selectable to enable social media users to join a game session.

Figure 8C:
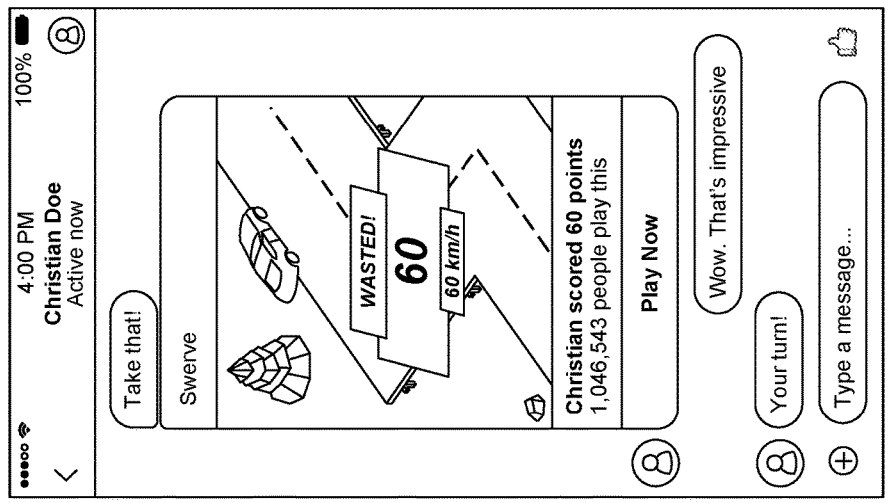
Figure 8D:
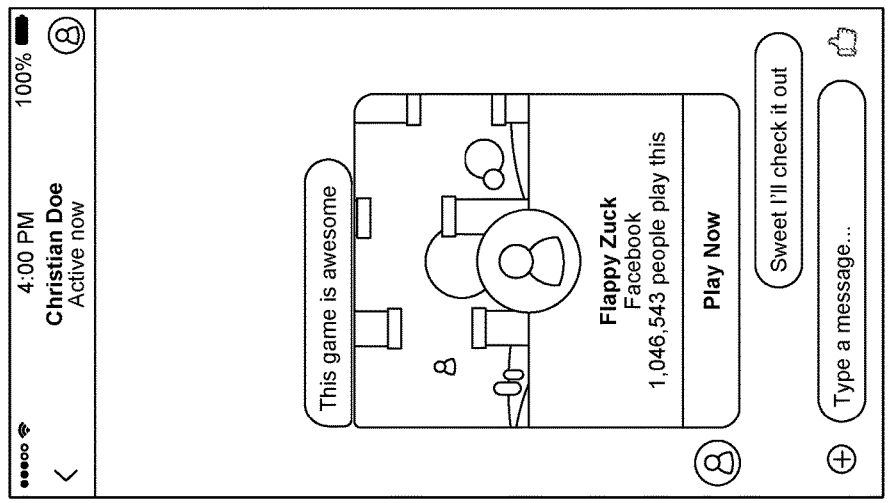

FIGS. 8C and 8D show a content entry shared in a message field of a message application. As shown in FIG. 8D, the content entry can include a real-time animation of the game session. The message application provides the animation for one or more user accounts included in the conversation. A user can select the content entry to join the game session.

Figure 9B:
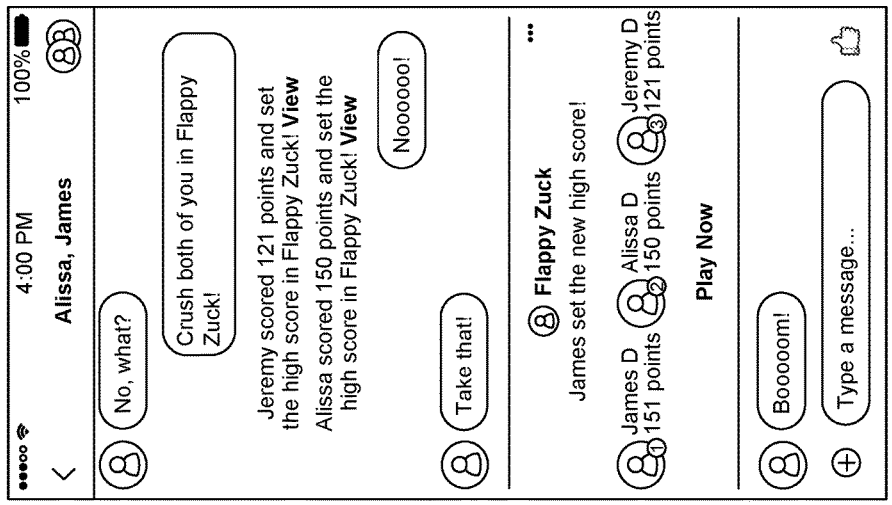
FIGS. 9A-9D are illustrations of an example graphical user interface on a client device.
Figure 9A:
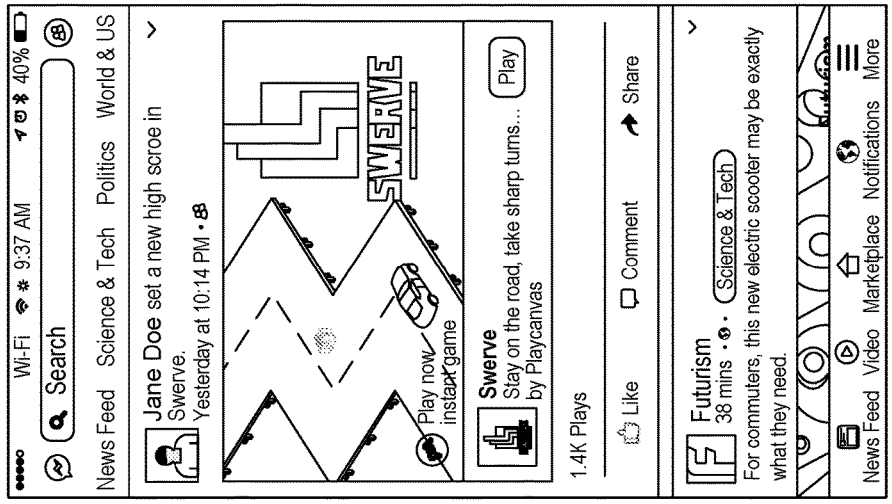
Figure 9C:
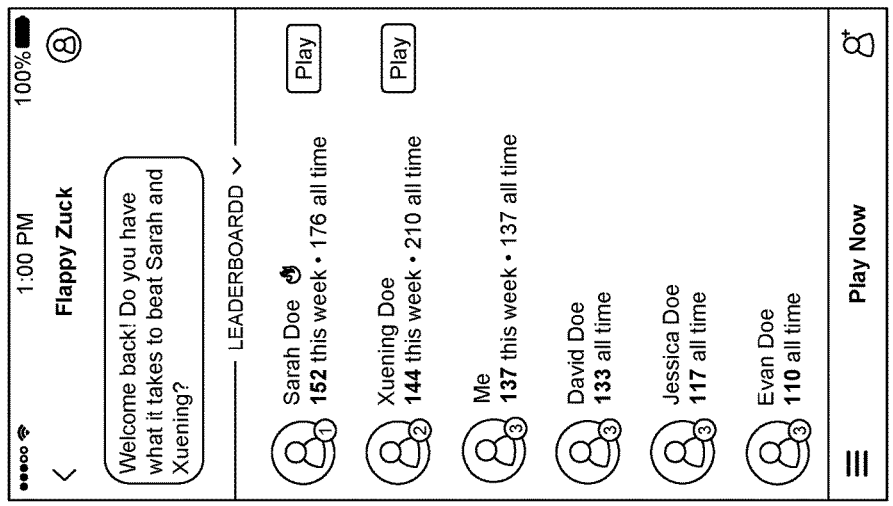
Figure 9D:
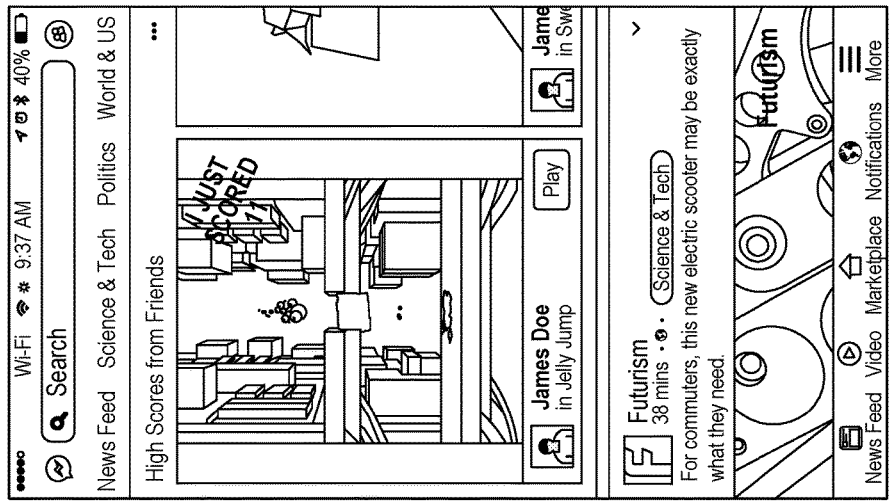

FIGS. 9A-9D are illustrations of an example graphical user interface on a client device. FIGS. 9A-9D show automated messages providing game-related information. FIG. 9A shows a content entry displayed in a news feed indicating that Jane Doe set a new high score in a game. FIG. 9B shows automated text included in a message field of a group conversation provided by a message application indicating that a new high score. FIG. 9C shows a plurality of content entries displayed in a news feed indicating high scores for a plurality of game objects. Additional content entries are provided upon receipt of an input gesture (e.g., detecting a swipe from left to right across a touchscreen). FIG. 9D shows a leaderboard with a plurality of high scores for a particular game including a rank for a user account compared to one or more user accounts associated with the user account (e.g., friends of the user account). The high scores are high scores in the online game for all social network users in the online conversation, all social network users who are messenger contacts of the first social network user, or all social network users.

Computer

Figure 10:
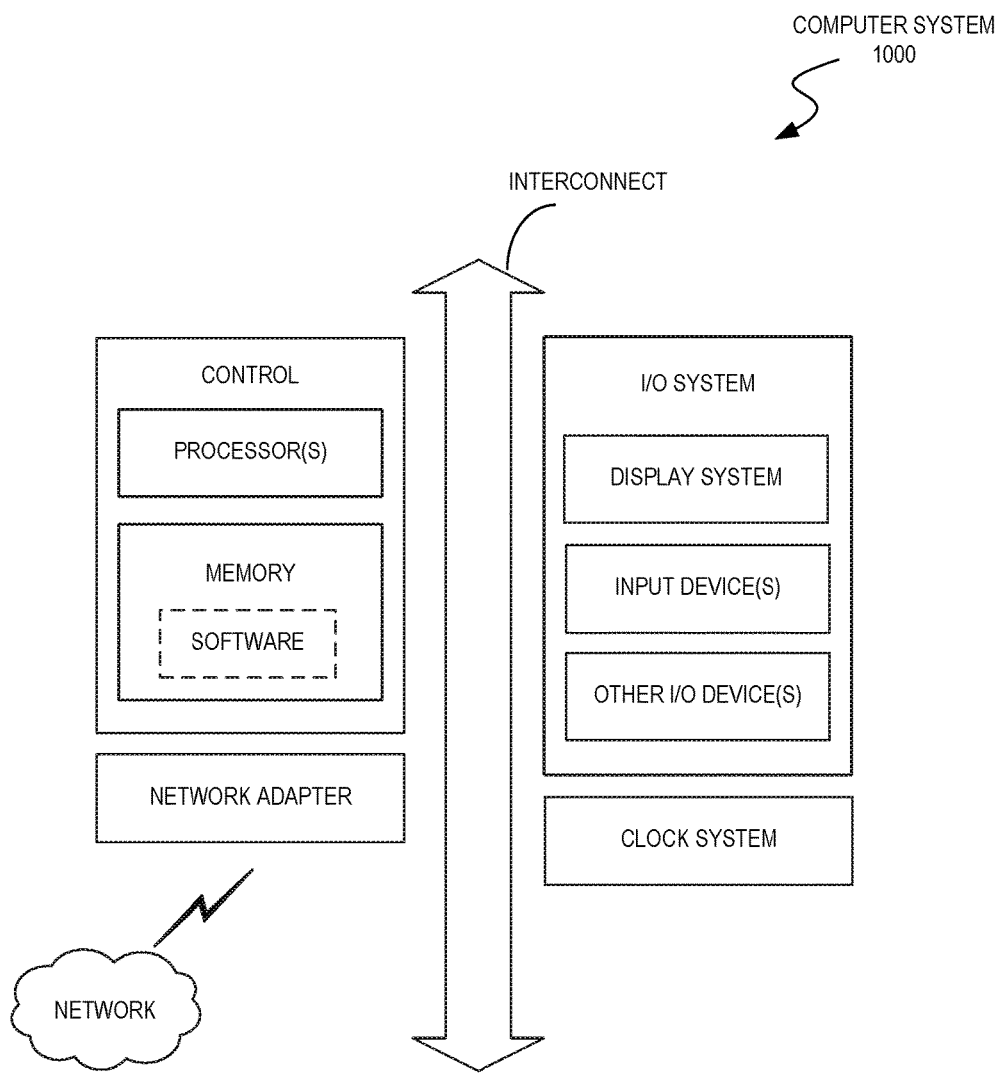
FIG. 10 is a block diagram illustrating an example computer system.

FIG. 10 is a diagrammatic representation of a machine in the example form of a computer system 1000 within which a set of instructions, for causing the machine to perform any one or more of the methodologies or modules discussed herein, may be executed.

In the example of FIG. 10, the computer system 1000 includes a processor, memory, non-volatile memory, and an interface device. Various common components (e.g., cache memory) are omitted for illustrative simplicity. The computer system 1000 is intended to illustrate a hardware device on which any of the components described in the example of FIGS. 1-9 (and any other components described in this specification) can be implemented. The computer system 1000 can be of any applicable known or convenient type. The components of the computer system 1000 can be coupled together via a bus or through some other known or convenient device.

This disclosure contemplates the computer system 1000 taking any suitable physical form. As example and not by way of limitation, computer system 1000 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 1000 may include one or more computer systems 1000; be unitary or distributed; span multiple locations; span multiple machines; or reside in a cloud, which may include one or more cloud components in one or more networks. Where appropriate, one or more computer systems 1000 may perform without substantial spatial or temporal limitation one or more steps of one or more methods described or illustrated herein. As an example and not by way of limitation, one or more computer systems 1000 may perform in real time or in batch mode one or more steps of one or more methods described or illustrated herein. One or more computer systems 1000 may perform at different times or at different locations one or more steps of one or more methods described or illustrated herein, where appropriate.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 1000. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, storing and entire large program in memory may not even be possible. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system 1000. The interface can include an analog modem, ISDN modem, cable modem, token ring interface, satellite transmission interface (e.g. "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), light emitting diode (LED) display, or some other applicable known or convenient display device. For simplicity, it is assumed that controllers of any devices not depicted in the example of FIG. 10 reside in the interface.

In operation, the computer system 1000 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux™ operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies or modules of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

Figure 11:
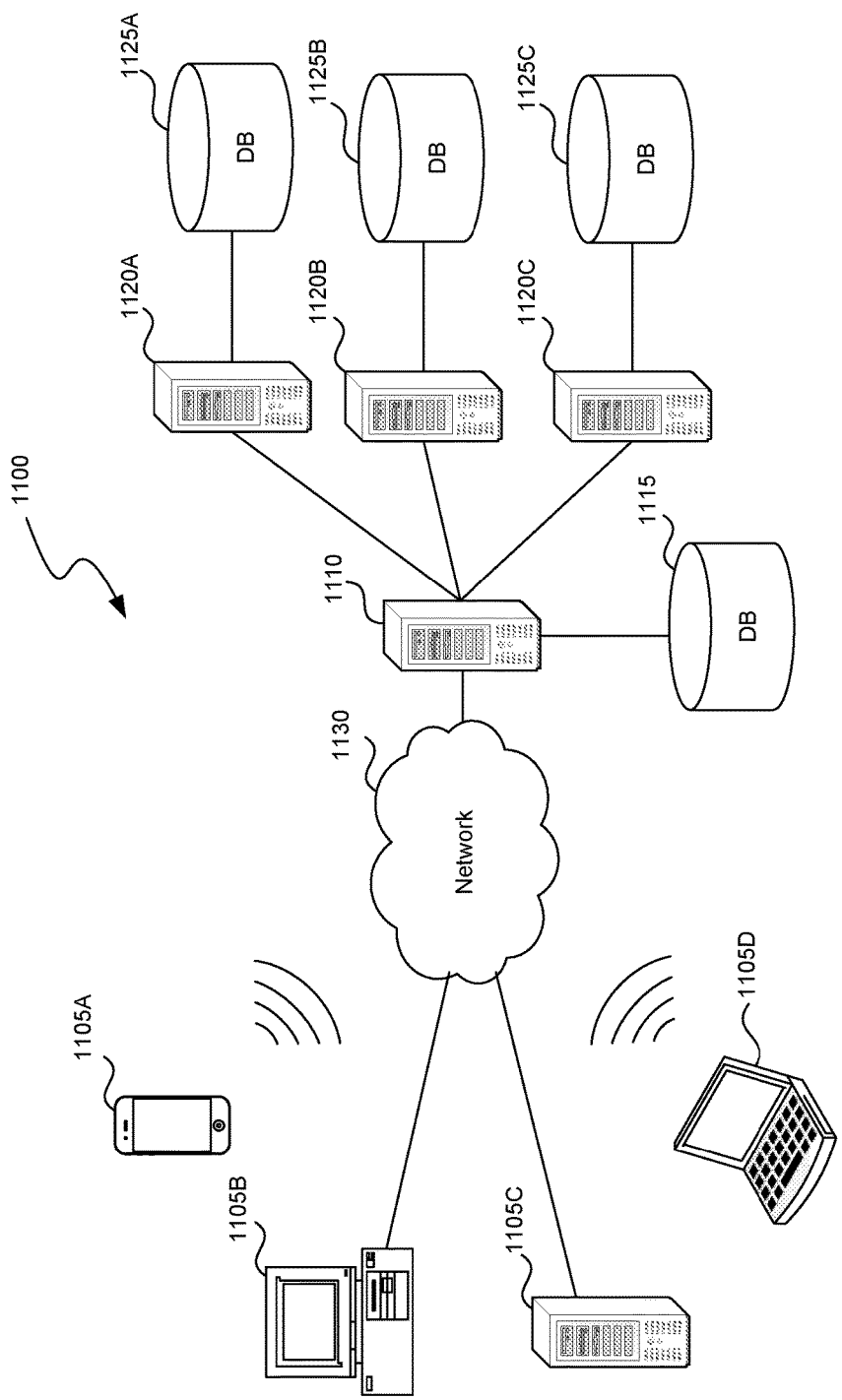
FIG. 11 is a block diagram illustrating an overview of an environment in which some implementations of the disclosed technology can operate.

FIG. 11 is a block diagram illustrating an overview of an environment 1100 in which some implementations of the disclosed technology may operate. Environment 1100 can include one or more client computing devices 1105A-D, examples of which may include computer system 1000. Client computing devices 1105 (e.g., client device 204) can operate in a networked environment using logical connections 1110 through network 1130 to one or more remote computers such as a server computing device.

In some implementations, server 1110 can be an edge server which receives client requests and coordinates fulfillment of those requests through other servers, such as servers 1120A-C. Server computing devices 1110 and 1120 can comprise computing systems, such as device 100. Though each server computing device 1110 and 1120 is displayed logically as a single server, server computing devices can each be a distributed computing environment encompassing multiple computing devices located at the same or at geographically disparate physical locations. In some implementations, each server 1120 corresponds to a group of servers.

Client computing devices 1105 and server computing devices 1110 and 1120 can each act as a server or client to other server/client devices. Server 1110 can connect to a database 1115. Servers 1120A-C can each connect to a corresponding database 1125A-C. As discussed above, each server 1120 may correspond to a group of servers, and each of these servers can share a database or can have their own database. Databases 1115 and 1125 can warehouse (e.g. store) information such as labeled images, parts models, histograms of gradients, classifiers, region templates, search images, and classified images or image parts. Though databases 1115 and 1125 are displayed logically as single units, databases 1115 and 1125 can each be a distributed computing environment encompassing multiple computing devices, can be located within their corresponding server, or can be located at the same or at geographically disparate physical locations.

Network 1130 can be a local area network (LAN) or a wide area network (WAN), but can also be other wired or wireless networks. Network 1130 may be the Internet or some other public or private network. The client computing devices 1105 can be connected to network 1130 through a network interface, such as by wired or wireless communication. While the connections between server 1110 and servers 1120 are shown as separate connections, these connections can be any kind of local, wide area, wired, or wireless network, including network 1130 or a separate public or private network.

Terminology

Brief definitions of terms, abbreviations, and phrases used throughout this application are given below.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described that may be exhibited by some embodiments and not by others. Similarly, various requirements are described that may be requirements for some embodiments but not others.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements. The coupling or connection between the elements can be physical, logical, or a combination thereof. For example, two devices may be coupled directly, or via one or more intermediary channels or devices. As another example, devices may be coupled in such a way that information can be passed there between, while not sharing any physical connection with one another. Additionally, the words "herein," "above," "below," and words of similar import, when used in this application, shall refer to this application as a whole and not to any particular portions of this application. Where the context permits, words in the Detailed Description using the singular or plural number may also include the plural or singular number respectively. The word "or," in reference to a list of two or more items, covers all of the following interpretations of the word: any of the items in the list, all of the items in the list, and any combination of the items in the list.

If the specification states a component or feature "may," "can," "could," or "might" be included or have a characteristic, that particular component or feature is not required to be included or have the characteristic.

The terminology used in the Detailed Description is intended to be interpreted in its broadest reasonable manner, even though it is being used in conjunction with certain examples. The terms used in this specification generally have their ordinary meanings in the art, within the context the disclosure, and in the specific context where each term is used. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that the same element can be described in more than one way.

Consequently, alternative language and synonyms may be used for any one or more of the terms discussed herein, but special significance is not to be placed upon whether or not a term is elaborated or discussed herein. A recital of one or more synonyms does not exclude the use of other synonyms. The use of examples anywhere in this specification, including examples of any terms discussed herein, is illustrative only and is not intended to further limit the scope and meaning of the disclosure or of any exemplified term. Likewise, the disclosure is not limited to various embodiments given in this specification.

Remarks

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the technology and its practical applications, thereby enabling others skilled in the relevant art to understand the claimed subject matter, the various embodiments, and the various modifications that are suited to the particular uses contemplated.

While embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Although the above Detailed Description describes certain embodiments and the best mode contemplated, no matter how detailed the above appears in text, the embodiments can be practiced in many ways. Details of the systems and methods may vary considerably in their implementation details, while still being encompassed by the specification. As noted above, particular terminology used when describing certain features or aspects of various embodiments should not be taken to imply that the terminology is being redefined herein to be restricted to any specific characteristics, features, or aspects of the technology with which that terminology is associated. In general, the terms used in the following claims should not be construed to limit the invention to the specific embodiments disclosed in the specification, unless those terms are explicitly defined herein. Accordingly, the actual scope of the invention encompasses not only the disclosed embodiments, but also all equivalent ways of practicing or implementing the embodiments under the claims.

The language used in the specification has been principally selected for readability and instructional purposes, and it may not have been selected to delineate or circumscribe the inventive subject matter. It is therefore intended that the scope of the invention be limited not by this Detailed Description, but rather by any claims that issue on an application based hereon. Accordingly, the disclosure of various embodiments is intended to be illustrative, but not limiting, of the scope of the embodiments, which is set forth in the following claims.

We claim:

1. A method, performed by a computing device, for providing an online game associated with a social network, comprising:

providing a private application program interface (API), the private API having one or more methods for performing a sequence of online game related operations, the operations comprising:

receiving a social network internal identifier, the social network internal identifier identifying an online conversation between at least two social network users; and receiving a gameplay command; and providing a public API, the public API having one or more methods for performing a sequence of online game related operations, the operations comprising:

receiving, from a game component, a game instance identifier, the game instance identifier identifying a particular instance of the online game, wherein the online game is capable of being played on one or more computing devices;

associating the received social network internal identifier with the game instance identifier; and transmitting, to the game component, the gameplay command to cause the game component to respond to the gameplay command.

2. The method of claim 1, wherein the gameplay command comprises one of: play, pause, or restart.

3. The method of claim 2, further comprising transmitting a pause command to a first instance of the game component executing within a context of a first application but transmitting the restart command to a second instance of the game component executing within a context of a second application, wherein the first instance and the second instance of the game component have a same game instance identifier.

4. The method of claim 3, further comprising receiving an indication that a first user has suspended playing the online game at the first application and restarted playing the online game at the second application.

5. The method of claim 4, wherein the first user and a second user continue to conduct the online conversation using a messaging service, further wherein the social network internal identifier comprises a messaging service thread identifier.

6. The method of claim 1, wherein providing the public API further comprises receiving, from the game component, status information regarding the online game and the private API further comprises transmitting, to a player component interposed between a social network server and a game library, the received status information.

7. The method of claim 6, wherein the received status information indicates one or more of loading progress, an indication that the online game has finished gameplay, a game score, or a crash notification.

8. A computer-readable storage device storing computer-executable instructions that, when executed by a processor, the instructions perform steps comprising:
   identifying, using a social network internal identifier, an online conversation between at least a first social network user and a second social network user;
   receiving a first game instance identifier stored in association with the social network internal identifier, the first game instance identifier corresponding to an online game that the first social network user has interacted with;
   receiving game status information corresponding to the online game having the first game instance identifier;
   storing the received game status information; and
   instructions for transmitting the received game status information to the second social network user.

9. The computer-readable storage device of claim 8, further comprising:
   in a first session with the first social network user, instructions for transmitting a command to pause the online game; and
   in a second session with the first social network user, instructions for transmitting a command to restart the online game;
   wherein the first session and the second session are different invocations of a messaging application, further wherein the social network internal identifier comprises a messaging service thread identifier.

10. The computer-readable storage device of claim 9, further comprising instructions for transmitting a game status of the online game at the end of the first session so that a corresponding game status at the start of the second session is identical.

11. The computer-readable storage device of claim 8, further comprising instructions for receiving score information from the online game and instructions for transmitting the score information in the online conversation.

12. The computer-readable storage device of claim 11, further comprising:
   in a first online conversation between the first social network user and the second social network user, instructions for transmitting a first score for the online game; and
   in a second online conversation between the first social network user and a third social network user, instructions for transmitting a second score for the online game;
   wherein the first online conversation has a first social network internal identifier, the second online conversation has a second social network internal identifier, and both online conversations have an identical game instance identifier.

13. The computer-readable storage device of claim 12, wherein instructions for transmitting the score information include instructions for transmitting a leaderboard of high scores.

14. The computer-readable storage device of claim 13, wherein the high scores are high scores in the online game for one of:
   all social network users in the first online conversation;
   all social network users who are messenger contacts of the first social network user; or
   all social network users.

15. A system, comprising:
   a component configured to provide a private application program interface (API), the private API having one or more methods for performing a sequence of online game related operations, the operations comprising:
      receiving, from a player component, a social network internal identifier, the social network internal identifier identifying an online conversation between at least two social network users; and
      receiving, from the player component, a gameplay command; and
   a component configured to provide a public API, the public API having one or more methods for performing a sequence of online game related operations, the operations comprising:
      receiving, from a game component, a game instance identifier, the game instance identifier identifying a particular instance of an online game, wherein the online game is capable of being played on one or more computing devices;
      associating the received social network internal identifier with the game instance identifier; and
      transmitting, to the game component, the gameplay command to cause the game component to respond to the gameplay command.

16. The system of claim 15, wherein the public API further comprises operations for transmitting a pause command to a first instance of the game component executing at a first computing device but transmitting a restart command to a second instance of the game component executing at a second computing device, wherein the first instance and the second instance have a same game instance identifier.

17. The system of claim 15, wherein:
   the component configured to provide the public API is further configured to receive, from the game component, status information regarding the online game; and the component configured to provide the private API is further configured to transmit, to the player component, the received status information.

18. The system of claim 17, wherein the received status information indicates one or more of loading progress, an indication that the online game has finished gameplay, a game score, or a crash notification.

19. The system of claim 15, wherein:

the gameplay command comprises one of: play, pause, or restart; and the online game can be paused at a first computing device and restarted at a second computing device.

20. The system of claim 15, wherein the player component is further configured to exchange, with a messaging service, communications pertaining to the online game.

* * * * *